United States Patent [19]
Smilansky et al.

[11] Patent Number: 5,339,176
[45] Date of Patent: Aug. 16, 1994

[54] APPARATUS AND METHOD FOR COLOR CALIBRATION

[75] Inventors: Zeev Smilansky, Rehovot; Haim Z. Melman, Kfar Saba; Yoav Bresler, Tel Aviv; Matty J. Litvak, Petach Tikva; Haim Kreitman; Itai Yad-Shalom, both of Kfar Saba, all of Israel

[73] Assignee: Scitex Corporation Ltd., Herzliya, Israel

[21] Appl. No.: 650,468

[22] Filed: Feb. 4, 1991

[30] Foreign Application Priority Data

Feb. 5, 1990 [IL] Israel .................................. 93274
Dec. 27, 1990 [IL] Israel .................................. 96816
Dec. 30, 1990 [IL] Israel .................................. 96829
Jan. 15, 1991 [IL] Israel .................................. 96955

[51] Int. Cl.$^5$ .......................... H04N 1/46; G03F 3/08
[52] U.S. Cl. ................................ 358/504; 358/518; 358/527
[58] Field of Search ................. 358/75, 76, 78, 80, 358/401, 406, 443, 444, 445, 448, 450, 452, 487, 296, 501, 504, 518, 523, 524, 527

[56] References Cited

U.S. PATENT DOCUMENTS

4,335,398 6/1982 Yamada .
4,500,919 2/1984 Schreiber .
4,717,954 1/1988 Fujita .
4,751,569 6/1988 Clinton et al. ........................ 358/76
(List continued on next page.)

FOREIGN PATENT DOCUMENTS

0144188A2 11/1984 European Pat. Off. .
0156393 10/1985 European Pat. Off. .
0166966 1/1986 European Pat. Off. .
(List continued on next page.)

OTHER PUBLICATIONS

R. K. Molla, "Electronic Color Separation", R. K. Printing & Publishing, New York, 1988.

G. Wyszecki et al, "Color Science", Wiley & Sons, 1982.
Stone et al, "Color Gamut Mapping and the Printing of Digital Color Images", ACM Trans. on Graphics, 7(4), Oct. 1988, pp. 249–292.

(List continued on next page.)

*Primary Examiner*—Edward L. Coles, Sr.
*Assistant Examiner*—Thomas D. Lee
*Attorney, Agent, or Firm*—Ladas & Parry

[57] ABSTRACT

There is disclosed technique and apparatus for calibrating a color processing device. The technique includes the steps of comparing a first digital representation of a colored image with a second digital representation thereof and employing at least the transformation to control operation of the color processing device to be calibrated. The first digital representation defines a plurality of first non-scalar color values and the second digital representation defines a plurality of second non-scalar color values corresponding to the plurality of the first non-scalar color values, thereby to provide a transformation pairing each individual one of the first non-scalar color values with a value relatively close to the corresponding one of the second non-scalar color values. The color processing device may be calibrated generally without reference to human aesthetic judgement. There is additionally provided a method and apparatus For transforming an element off a domain of a first color printing device to an element of a domain of a second color printing device. The method comprises the steps of providing a first transformation from a first digital representation of a colored image to a second digital representation thereof and a second transformation from a third digital representation of a colored image to a fourth digital representation thereof and comparing the first transformation with the second transformation. The second transformation corresponds to the second color printing device, the first transformation corresponds to the first color printing device and the second and fourth digital representations are defined within a single color space.

64 Claims, 21 Drawing Sheets

U.S. PATENT DOCUMENTS

| | | |
|---|---|---|
| 4,775,886 | 10/1988 | Hirosawa .......................... 358/452 |
| 4,929,978 | 5/1990 | Kanamori et al. . |
| 5,150,199 | 9/1992 | Shoemaker et al. ................. 358/80 |

FOREIGN PATENT DOCUMENTS

| | | |
|---|---|---|
| 0238034 | 9/1987 | European Pat. Off. . |
| 1110154 | 7/1989 | Japan . |
| 1120956 | 8/1989 | Japan . |
| 2023776 | 3/1990 | Japan . |

OTHER PUBLICATIONS

J. Stoer, "Introduction to Numerical Analysis", Springer-Verlag, New York, 1980.

De Boor, "A Practical Guide to Splines", Applied Math. Sciences, vol. 27, Springer–Verlag, New York, 1978.

Bartels et al, "An Introduction to Splines . . . ", Morgan Kaufmann Publishers Inc., Los Altos, Calif., 1987.

Engeldrum, "Almost Color Mixture Functions", J. of Imaging Technology, 14 (4) Aug., 1988.

R. Holub et al, "Color Systems Calibration for Graphic Arts", (I & II), Jou. of Imaging Tech., vol. 14, No. 2, Apr. 1988, pp. 47–60.

Marquet, "Dehalftoning of Negatives . . . ", Optica Acta 6, pp. 404–405.

Marquet et al, "Interpretation of Particular Aspects of . . . ", Optica Acta 8, 1961, pp. 267–277.

Kermisch et al, "Fourier Spectra of Halftone Images", J. Opt. Soc. Amer., 65, 1975, pp. 716–723.

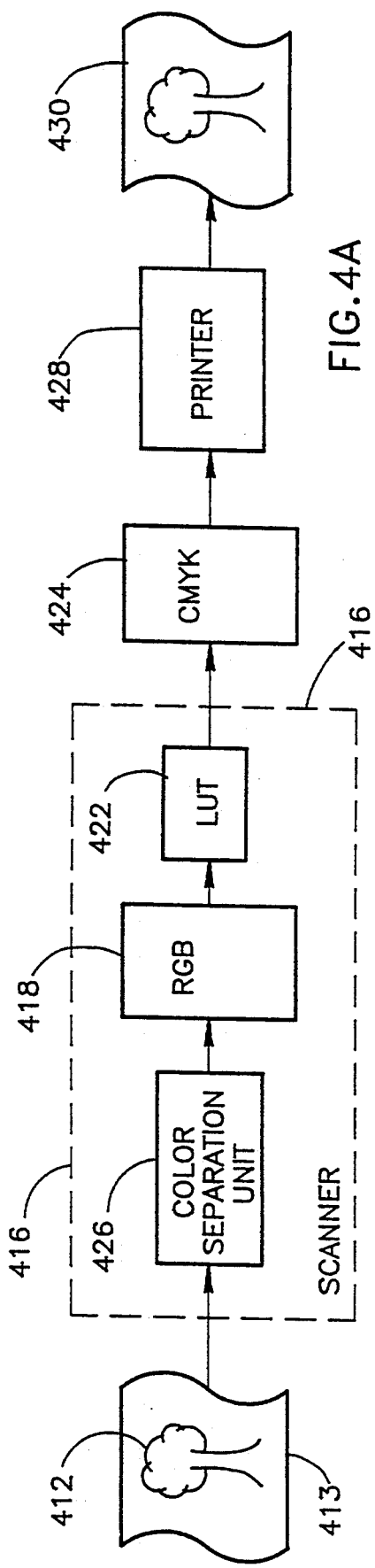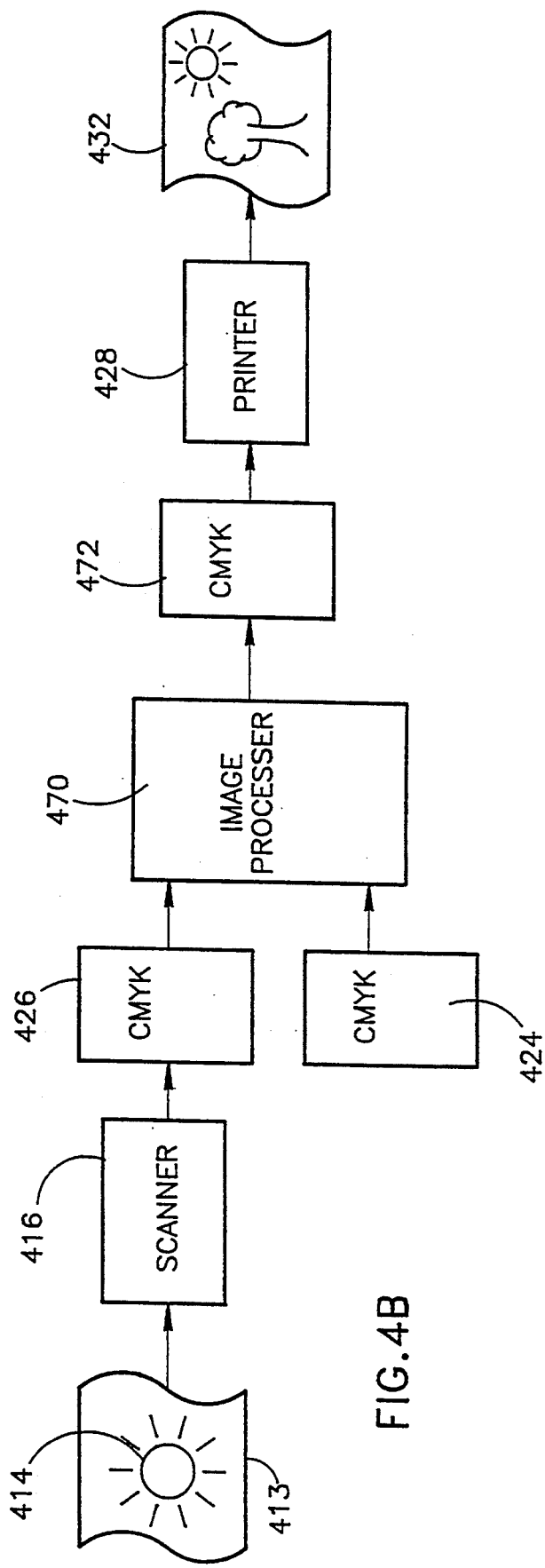
FIG.4A
FIG.4B

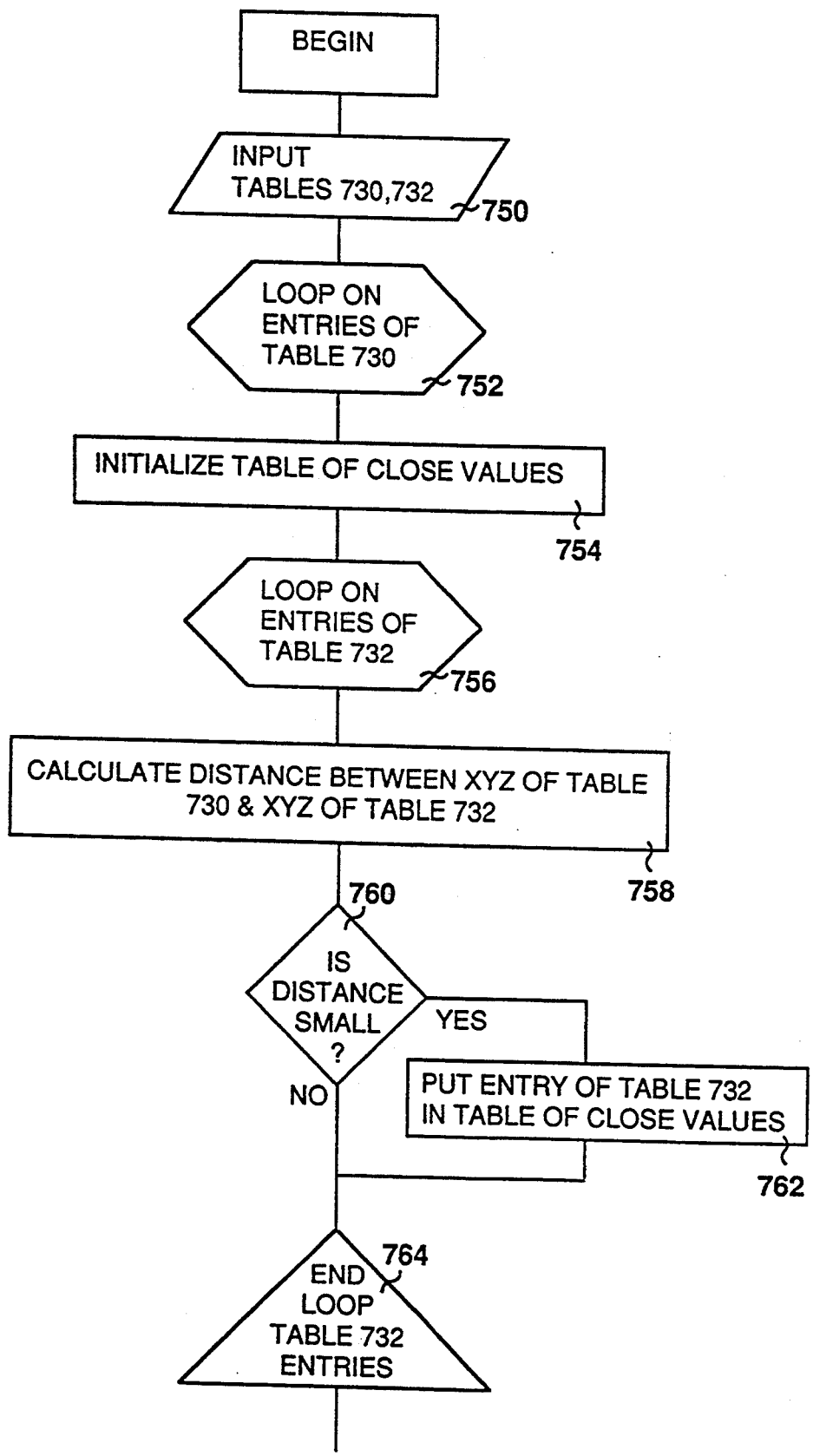
FIG.10/1

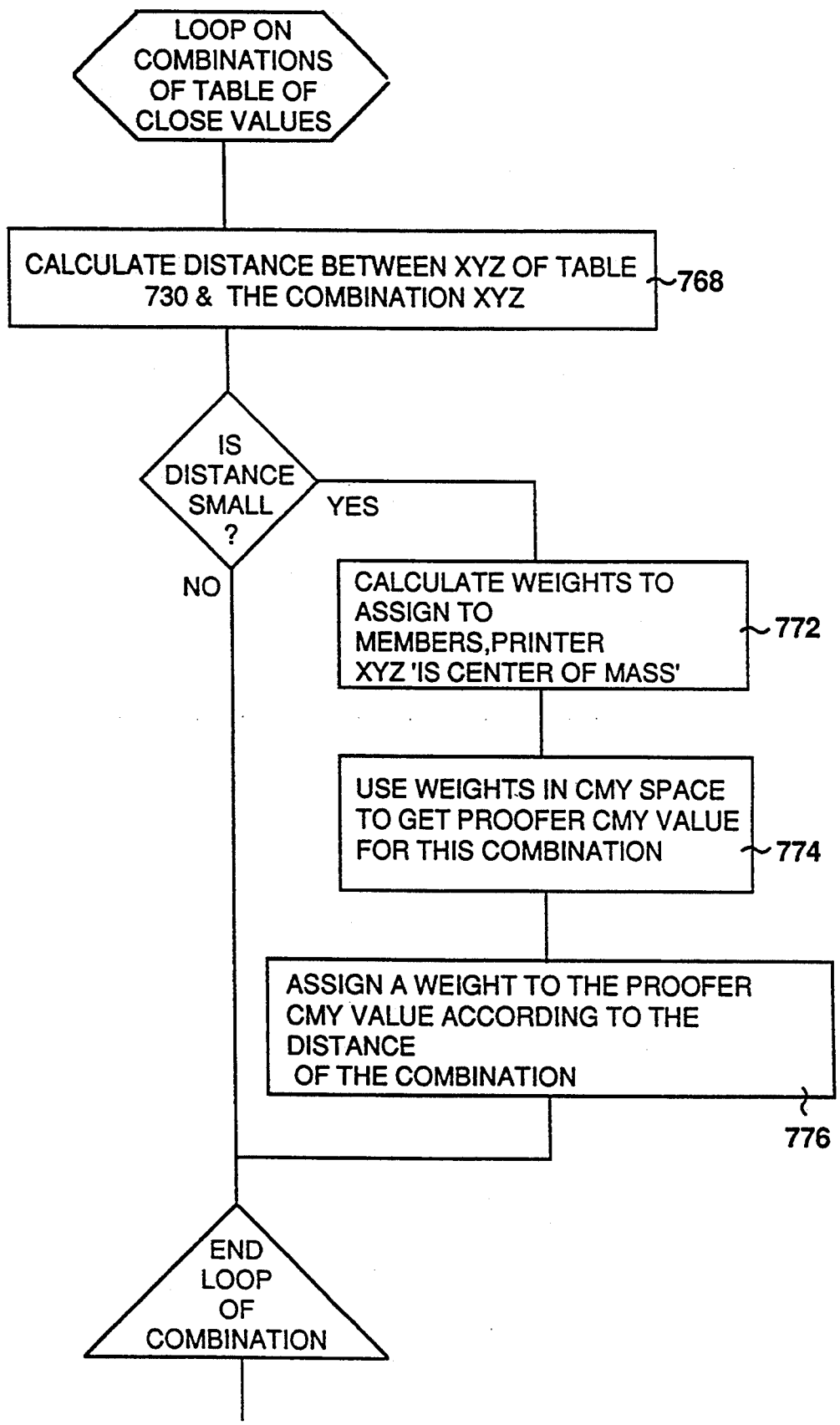
FIG.10/2

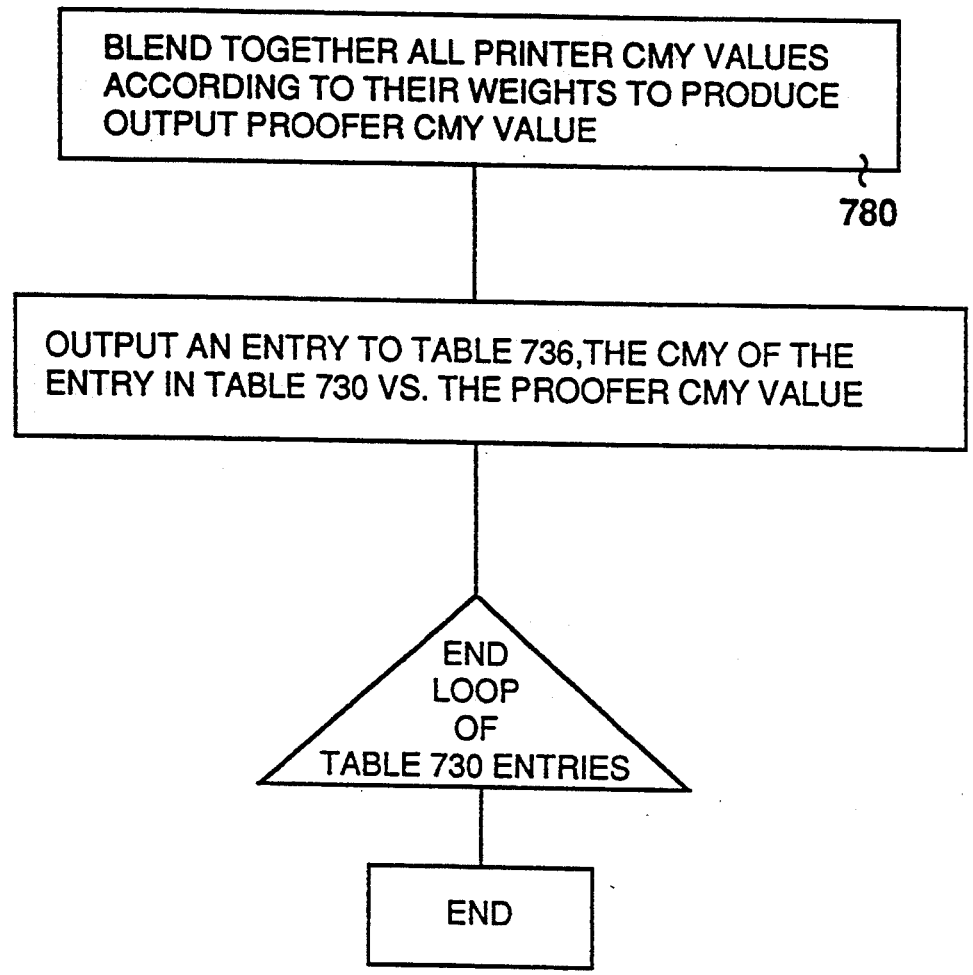
FIG.10/3

APPARATUS AND METHOD FOR COLOR CALIBRATION

FIELD OF THE INVENTION

The present invention relates to techniques for tone and color reproduction control in graphic arts.

BACKGROUND OF THE INVENTION

Scanning methods are reviewed in R. K. Molla, *Electronic Color Separation*, R. K. Printing & Publishing, New York, 1988, the disclosure of which is incorporated herein by reference. The principles of color are explained in G. Wyszecki and W. S. Stiles, *Color Science*, Wiley & Sons, 1982, the disclosure of which is incorporated herein by reference.

Generally speaking, tone and color reproduction control in high quality graphic arts reproduction is still far from a science. This is particularly evident when a given acceptable result, already realized using given reproduction apparatus, is sought to be realized using other apparatus or using the same apparatus but with a different setting, such as a GCR setting relative to a normal "key black" setting. In such cases, a high degree of expertise, combined with time, effort, expense and patience is required to calibrate the additional apparatus. The results are not always satisfactory.

Unidimensional calibrations in graphic arts, in which a plurality of calibrations are carried out, each being a function of only one color, are known. State of the art techniques include gray balance correction and plotter output calibration techniques. Another example of unidimensional calibration is the automatic TCR (tone and color reproduction) correction process disclosed in published European Application 84307997.1 of Xerox Corporation (Publication number 0144188 A2).

The disadvantage of unidimensional calibrations is that they are only accurate in certain portions of the color space, since a full determination of color is multidimensional, typically having three or four components. For example, the teaching of the above-mentioned published European Application 8437997.1 is relatively inaccurate except in the area of a particular machine's primary color coordinate axes. Gray balance techniques are relatively inaccurate except for a relatively small volume of the color space, comprising gray colors only. Also, the apparatus disclosed in the above-cited published European Application 8437997.1 can be calibrated only by its own output.

Methods of computing a multidimensional function to fit a given set of vectors are known. Interpolative methods may be used if the data is suitably distributed. However the desired conditions regarding the distribution do not always hold in color processing applications, because the data is often not produced directly but rather is the end result of certain procedures (such as scanning, printing, etc.) which are performed on initial preselected data.

An article by Stone et al (Stone, M. C.; Cowan, W. B. and Beatty, J. C., "Color Gamut Mapping and the Printing of Digital Color Images", *ACM Transactions on Graphics*, 7(4), October 1988, 249–292) discloses use of a colorimeter in mapping a color gamut and printing digital color images, using human aesthetic judgement as a criterion. Human aesthetic judgement is not always the most relevant nor the most efficient criterion for calibrating a color processing device, particularly when it is desired to use another color processing device as a calibration reference. The use of a colorimeter as disclosed by Stone et al is typically cumbersome and time-consuming.

U.S. Pat. No. 4,500,919 to Schreiber discloses a system for producing color reproductions of an image in which an operator may interactively manipulate a display of the scanned image in order to introduce aesthetic, psychophysically referenced corrections therein. Schreiber teaches that it is desirable for such a system to provide automatic compensation for the effects of ink and paper while allowing the operator to input aesthetic alterations.

U.S. Pat. No. 4,719,954 to Fujita et al. describes a method and apparatus for creating a color conversion table between scanned colors of a color chart, typically in the Red-Green-Blue (RGB) color coordinate system, and printable colors, typically in the Cyan-Magenta-Yellow-Black (CMYK) color coordinate system, and for using the color conversion table to reproduce a selected measured color in a color specimen. If the selected measured color does not coincide with a value in the color conversion table, an interpolation step is performed.

The method of Fujita et al also includes a correction step when reproduction is performed under different printing conditions. The correction step compensates for the difference between the two printing conditions.

Image creation systems typically comprise a computer with associated graphic software for generating digital representations of color images and/or modifying digital representations of color images, and a plotter or other color output device For transforming the digital representations into analog representations. The analog representation may be created on any suitable substrate, such as on a dia. If desired, e.g. in pre-press applications, the resulting dia can be scanned.

Examples of commercially available graphic software are Photoshop, by Adobe Systems Inc., Mountainview, Calif., U.S.A., usable in conjunction with the Mac II by Apple Computer Inc., U.S.A.; and PC Paintbrush Plus, by ZSoft, San Francisco, Calif., U.S.A., usable in conjunction with the IBM PC. Examples of commercially available plotters are 4cast, by DuPont, Wilmington, Del., U.S.A., and the LVT Model 1620 digital image recorder by Light Valve Technology, Rochester, N.Y., U.S.A.

SUMMARY OF THE INVENTION

The following terms as used in the present specification and claims should be construed in the following manner:

Analog representation of a colored image: A representation of a colored image which is perceivable by the human eye as a colored image. The representation may appear upon a transparency, a photograph, a CRT display, a printed page, etc.

Digital representation of a colored image. Any representation of a colored image which is expressed in discrete symbols, such as numerical symbols. A common digital representation of a colored image is a digital file comprising a plurality of numerical values corresponding to a plurality of pixels into which the colored image has been divided, each such numerical value representing some aspect pertaining to the colored appearance of the corresponding pixel.

Substrate: Physical apparatus bearing or displaying an analog representation of an image, e.g. transparency, Cromalin (registered trademark), CRT display, photograph, paper, surfaces suitable for painting on, etc.

Range of color processing apparatus: The totality of color values which can be output by the color processing apparatus.

Domain of color processing apparatus: The totality of color values which can be input by the color processing apparatus.

Color processing apparatus: Apparatus which inputs a first representation of a colored image (digital or analog) and converts it into a second representation thereof (analog or digital), thereby to define a transformation from at least a portion of the range into the domain.

Image creation system: Apparatus which creates an image internally or one which takes as input a representation of a color image and modifies it. Such a system can create the color image from geometrical shapes, can alter the shape and can select and/or modify the color of the color image.

Color reading apparatus: Apparatus which inputs an analog representation of a colored image and converts it to a digital representation thereof. e.g., ECSS, DECSS, colorimeters, spectrum analyzers, densitometers. Typically, the digital representation is expressed in a coordinate system such as XYZ, CMYK, RGB, etc.

Printing machine/device/system; output apparatus, recording apparatus etc.: Any apparatus which inputs a digital representation of a colored image and converts it into an analog representation thereof. For example: conventional, offset, gravure, or other printing apparatus employing inks, conventional or direct digital proofing machines, plotters or color recorders which expose photographic materials, electrostatic printing systems employing powder colorants, color monitors, and color CRT displays.

Calibration: Adjusting color processing apparatus in order to obtain representations, having predetermined substantially objective color characteristics, of colored images sought to be processed.

Color value: A representation of a color, typically in a color coordinate system such as but not limited to RGB, L*a*b*, XYZ coordinate systems and device dependent coordinate systems such as color head signals e.g. RGB, ink percentages e.g. CMYK, etc.

Colorant, ink, etc.: Any stimulant of the human eye's light energy receptors, typically through emission, transmission or reflection of photons, including liquid colorants, powder colorants, photographic colorants, phosphors, etc.

Colorant values: A digital representation of the amount of a colorant which it is sought to use.

It is appreciated that any references to color, colored images, color values, colorant values, etc. in the present specification are intended to include the instances of black and white as colors or color values, black and white images, black colorant and ink, etc. The following abbreviations are used:

TCR: tone and color reproduction
GCR: gray component replacement
UCR: Undercolor removal
UCA: Undercolor addition
RGB: red, green, blue. More generally, the term as used herein may refer to any color signals produced by a color reading device. In a color separation scanner, the term normally refers to the color separation signals of the scanner prior to processing thereof.
CMYK: cyan, magenta, yellow, black (colorants such as inks). More generally, the term as used herein refers to any signals which may serve as input for a color printing device.
ECSS: electronic color separation scanner
DECSS: digital electronic color separation scanner The present invention seeks to provide a technique for multidimensional calibration of graphic arts reproduction apparatus, which simplifies and greatly expedites the process of calibration of graphic arts reproduction apparatus to faithfully reproduce desired color and tone. Preferably, the technique provides generally accurate calibration of the apparatus throughout substantially the entirety of the range of colors producible by the apparatus.

There is thus provided in accordance with a preferred embodiment of the present invention, a technique for calibrating graphic arts reproduction apparatus using color measuring apparatus (such as the "Smart Scanner" available from Scitex Corporation, Herzlia, Israel, colorimeters, densitometers, etc.) including the steps of providing a transformation of or function from first color values to second color values and employing the transformation to control operation of graphic arts reproduction apparatus. The terms "transformation" and "function" are used interchangeably throughout the present specification. The transformation may be stored as a LUT (look up table) and the data may be transferred using any suitable communication method.

The following procedures, among others, may be greatly simplified and rendered more time efficient and effective using preferred embodiments of the present invention:

1. Incorporating a new color separation scanner (CSS), such as a digital electronic color separation scanner, into an existing reproduction system using automatic calibration that emulates the tone and color reproduction of the existing system.

2. Compensating for a different printing or proofing machine or a different setting on the same machine, by adjustment of the tone and color transformation of a digital electronic color separation scanner, or by adjustment of the digital representation of the picture, such that the printed picture characteristics of tone and color are nearly identical notwithstanding which printing machine or setting is employed.

3. Creating upon a first substrate a duplication of an analog representation of a colored image upon a second substrate. Preferably, both substrates are formed of the same medium or of similar media.

4. Restoring an input copy for given color processing apparatus from an available output copy thereof. Typically, the input and output copies are hard copies. Preferably, the restored input copy, if input to the color processing apparatus, will result in an output copy substantially identical to the available output copy.

5. Incorporating a new digital electronic color separation scanner into an existing reproduction system using automatic calibration to achieve emulation of a UCR (under colorremoval), GCR (gray component replacement) or UCA (under color addition) reproduction produced by the existing system, or to emulate any other special reproduction setting to which the existing system may be set.

6. Calibration of a color monitor display with reference to output apparatus, thereby to provide a representation of a colored image on a color monitor display which is substantially identical to a hard copy representation of that image processed on a given printing device.

7. Enabling an image processing device to process digital data defined in a coordinate system other than the coordinate system of the image processing device.

In accordance with a preferred embodiment of the present invention, the above procedures may be carried out automatically or manually in a straight-forward algorithmic manner, substantially without trial and error. The procedures are preferably non-interactive and are without decision points requiring a decision by a human operator. The procedures may be carried out using an electronic color separation scanner having digital tone and color modules, such as the Smart Scanner, commercially available from Scitex Corporation Ltd., of Herzlia, Israel.

Preferably, the color processing device is calibrated such that substantially all inputs thereto may thereafter be satisfactorily processed thereby.

There is thus provided in accordance with a preferred embodiment of the present invention a technique for calibrating a color processing device including the steps of comparing a first digital representation of a colored image with a second digital representation thereof, the first digital representation defining a plurality of first non-scalar color values, the second digital representation defining a plurality of second non-scalar color values corresponding to the plurality of the first non-scalar color values, thereby to provide a transformation pairing each individual one of the first non-scalar color values with a value relatively close to the corresponding one of the second nonscalar color values, and employing at least the transformation to control operation of the color processing device to be calibrated, whereby the color processing device may be calibrated generally without reference to human aesthetic judgement.

Further in accordance with a preferred embodiment of the present invention, the technique is algorithmic.

Still further in accordance with a preferred embodiment of the present invention, the technique is non-interactive.

Additionally in accordance with a preferred embodiment of the present invention, the first and second digital representations are not provided by a colorimeter.

Additionally in accordance with a preferred embodiment of the present invention, the first and second digital representations ape not in an XYZ coordinate system.

Further in accordance with a preferred embodiment of the present invention, the first and second digital representations are read by color reading apparatus whose colorimetric response differs from the colorimetric response of the human eye.

Still further in accordance with a preferred embodiment of the present invention, the first and second digital representations ape read by color reading apparatus whose colorimetric response is not mathematically transformable to any colorimetric response similar to the colorimetric response the human eye.

Still further in accordance with a preferred embodiment of the present invention, at least some of the non-scalar color values include a black component.

Additionally in accordance with a preferred embodiment of the present invention, the plurality of first non-scalar color values includes a plurality of 3-dimensional color values.

Further in accordance with a preferred embodiment the present invention, the plurality of second non-scalar color values includes a plurality of 3-dimensional color values.

Still further in accordance with a preferred embodiment of the present invention, the color processing device includes a color reading device or printing device.

Additionally in accordance with a preferred embodiment of the present invention, the technique also includes, prior to the step of comparing, the step of automatically scanning an analog representation of the colored image, thereby to provide at least one of the first and second digital representations.

Still further in accordance with a preferred embodiment of the present invention, the technique also includes the step of using the calibrated device to create upon a second substrate a duplication of an analog representation of a colored image upon a first substrate.

Additionally in accordance with a preferred embodiment of the present invention, the technique also includes the step of using the calibrated device to create an input copy of a colored image which, when processed by the calibrated device, will result in a given output copy of the colored image.

Further in accordance with a preferred embodiment of the present invention, the technique also includes the step of comparing the second digital representation with a third digital representation of the colored image, the third digital representation defining a plurality of third non-scalar color values, thereby to provide a second transformation pairing each individual one of the second non-scalar color values with a value relatively close to the correpsonding one of the third non-scalar color values and the step of employing includes the step of employing both the transformations to control operation of the color processing device to be calibrated.

Additionally in accordance with a preferred embodiment of the present invention, the color processing device to be calibrated includes a color monitor display.

Still further in accordance with a preferred embodiment of the present invention, the first digital representation is characterized in that processing the first digital representation of the colored image with the color processing device provides a second representation of the colored image which defines a provided plurality of color values, each individual one of the provided plurality of color values being substantially equal to a corresponding one of a predetermined plurality of color values Falling within the range of the color processing device.

According to another preferred embodiment of the present invention, there is provided apparatus for sampling the color processing characteristics of a color processing device, the color processing device being operative to convert a first representation of a colored image to a second representation thereof, the sampling apparatus including a first representation of a colored image characterized in that processing the first representation of the colored image with the color processing device provides a second representation of the colored image which defines a provided plurality of color values, each individual one of the provided plurality of color values being substantially equal to a corresponding one of a predetermined plurality of color values falling within the range of the color processing device.

Further in accordance with a preferred embodiment of the present invention, the predetermined plurality of color values is characterized in that generally any region of a given size at least partially overlapping the range of the color processing device contains therewithin at least a predetermined number of color values.

Still further in accordance with a preferred embodiment of the present invention, the first representation includes a digital representation or an analog representation.

Additionally in accordance with a preferred embodiment of the present invention, the second representation includes a digital representation.

According to yet a further preferred embodiment of the present invention, there is provided a method of constructing apparatus for sampling the color processing characteristics of a color processing device, the color processing device being operative to convert a first representation of a colored image to a second representation thereof, the method including the step of repeating at least once the steps of providing first and second representations of a colored image, the representations respectively including a first multiplicity of first color values and a second multiplicity of second color values corresponding thereto, the first and second representations being characterized in that processing the first representation with the color processing device defines the second representation, comparing the first representation of the colored image with the second representation thereof, thereby to provide a transformation, characterized in that operating the transformation on each individual one of the second multiplicity of second color values gives a value substantially equal to the corresponding one of the first multiplicity of first color values, and operating the transformation on the first representation of the colored image, thereby to provide a third representation thereof.

Further in accordance with a preferred embodiment of the present invention, the transformation is a function defined and continuous over generally the entirety of the range of the color processing device.

In accordance with a preferred embodiment of the present invention there is provided apparatus for sampling the color processing characteristics of a color processing device, the sampling apparatus being constructed in accordance with a method for constructing sampling apparatus, the method being in accordance with a preferred embodiment of the present invention.

Further in accordance with a preferred embodiment of the present invention, the step of repeating at least once includes the step of repeating at least twice the steps of providing, processing, comparing and operating and for each repetition from the second onward, the first representation of the colored image provided includes the third representation of the colored image provided in the previous repetition.

Additionally in accordance with a preferred embodiment of the present invention, the third representation defines a plurality of color values and the step of repeating at least twice includes the step of repeating the steps of providing, processing, comparing and operating until the plurality of color values defined by the third representation obtained in the last repetition are at a predetermined degree of closeness to a predetermined plurality of color values located within the range of the color processing device.

There is also provided in accordance with a preferred embodiment of the present invention, a technique for quality control of a color processing device operative to convert a first representation of a colored image to a second representation thereof, the technique including the steps of providing apparatus for sampling the color processing characteristics of the color processing device, the sampling apparatus including a first representation of a colored image characterized in that processing the first representation of the colored image with the color processing device provides a second representation of the colored image which defines a provided plurality of color values, each individual one of the provided plurality of color values being substantially equal to a corresponding one of a predetermined plurality of color values falling within the range of the color processing device, processing the sampling apparatus on the color processing device and employing the results of the processing step of control oepration of the color processing device.

There is also provided in accordance with yet another preferred embodiment of the present invention a technique for repeatibility testing of a color processing device operative to convert a first representation of a colored image to a second representation thereof, the technique including the steps of providing apparatus for sampling the color processing characteristics of the color processing device, the sampling apparatus including a first representation of a colored image characterized in that processing the first representation of the colored image with the color processing device provides a second representation of the colored image which defines a provided plurality of color values, each individual one of the provided plurality of color values being substantially equal to a corresponding one of a predetermined plurality of color values falling within the range of the color processing device, processing the sampling apparatus on the color processing device; repeating the step of processing on at least one further occasion, and comparing the results of at least two repetitions of the processing steps.

There is provided, in accordance with the present invention, apparatus for transforming an element of a domain of a first color printing device to an element of a domain of a second color printing device and a technique for producing same. The invention is described herein as an apparatus, it being understood that the invention includes a method for performing the operations of the apparatus.

The apparatus includes apparatus for providing a first transformation from a first digital representation of a colored image to a second digital representation thereof and a second transformation from a third digital representation of a colored image to a fourth digital representation thereof and apparatus for comparing the first transformation with the second transformation. The second transformation corresponding to the second color printing device, the first transformation corresponding to the first color printing device and the second and fourth digital representations being defined within a single color space.

Additionally, in accordance with the present invention, the apparatus includes apparatus for storing the output of the apparatus for comparing.

Further, in accordance with the present invention, the output of the apparatus for comparing defines a first plurality of matchings between s first plurality of elements of the domain of the second color printing device and a corresponding first plurality of elements of the domain of the first color printing device and wherein the apparatus for storing include apparatus for providing a second plurality of matchings between the domain of the first color printing device and the domain of the second color printing device, the second plurality exceeding the first plurality in number.

Still further, in accordance with the present invention, the apparatus for storing also includes apparatus for modifying at least some of the corresponding first plurality of elements of the domain of the first color printing device operative prior to the operation of the apparatus for providing a second plurality of matchings.

Moreover, in accordance with the present invention, the apparatus for providing includes apparatus for interpolating between individual ones of the first plurality of matchings, thereby to provide individual ones from among the second plurality of matchings. The apparatus for interpolating includes apparatus for carrying out non-linear interpolation between individual ones of the first plurality of matchings. The apparatus for carrying out non-linear interpolation includes apparatus for fitting a tensor of splines to individual ones of the first plurality of elements of the first domain.

Additionally, in accordance with the present invention, the apparatus of the present invention additionally includes apparatus for employing the stored results to control operation of the first color printing device.

Furthermore, in accordance with the present invention, the apparatus for comparing includes apparatus for searching among the elements of the second digital representation for a plurality of close elements whose values are close to an element of the fourth digital representation, apparatus for forming a multiplicity of subsets, each individual one of the subsets containing some of the plurality of close elements, and apparatus for selecting individual ones from among the multiplicity of subsets. The apparatus for comparing also includes for each individual selected subset, first apparatus for combining the elements of the first digital representation corresponding to the members of the individual selected subset, thereby to define a combination value for the individual selected subset and second apparatus for combining the combination values of each of the individual selected subsets, thereby to provide an element within the first digital representation corresponding to the element within the fourth representation.

Additionally, in accordance with the present invention, the first apparatus for combining includes apparatus for assigning a weight to each member of each individual selected subset, the weights being characterized in that, for each individual selected subset, the element of the fourth digital representation is the center of mass of the weighted members of that subset and apparatus for computing a weighted sum of the members of the individual selected subset. The second apparatus for combining includes apparatus for assigning a weight to each individual selected subset, the weights reflecting the arrangement of the members of the individual selected subset relative to the element of the fourth digital representation and apparatus for computing a weighted sum of the members of the individual selected subset.

Moreover, in accordance with the present invention, the apparatus fop selecting includes apparatus for inspecting the arrangements of the members of the multiplicity of subsets relative to the element of the fourth digital representation and apparatus for selecting individual ones from among the multiplicity of subsets in accordance with the result of the step of inspecting.

Still further, in accordance with the present invention, the apparatus includes apparatus for producing a new first transformation using the stored output and apparatus for repeatedly operating the apparatus for comparing and for storing thereby to produce a new transformation between an element of the domain of the first color printing device to an element of the domain of the second color printing device. The apparatus for employing utilize a color converter for converting the domain of the first color printing device to the domain of the second color printing device.

There is also provided, in accordance with the present invention, apparatus for quantifying the appearance of an analog representation of a location of a colored image including apparatus for providing an n-dimensional representation of the location, wherein n is at least 4.

Additionally, in accordance with the present invention, the analog representation of the location is provided by printing a digital representation of the location and wherein the apparatus for providing includes apparatus for providing a 3 dimensional representation of the color of the location and apparatus for computing at least a fourth value as a function of the digital representation of the location.

Alternatively, the apparatus for computing may be replaced by apparatus for measuring the fourth value directly from the analog representation.

Furthermore, in accordance with the present invention, the three dimensional representation is a colorimetric representation which can be CIE XYZ or CIE L*a*b*.

There is additionally provided, in accordance with the present invention, a system for converting between a digital and an analog representation of an image comprising a translation system for translating a reading and writing point across a substrate, a color proofer comprising the writing point for writing, from the digital representation, the analog representation onto the substrate and a color reading system comprising the reading point for reading the digital representation from the analog representation.

Additionally, in accordance with the present invention, the translation system comprises a drum for rotating the substrate and a translating carriage for translating along the drum.

Moreover, in accordance with the present invention, the system includes apparatus for transforming an element of a domain of a first color printing device to an element of a domain of a second color printing device such as described hereinabove.

There is further provided, in accordance with a preferred embodiment of the present invention, a technique for controlling the operation of an image processing device having a first color coordinate system and including the steps of receiving a digital representation of a color image defined in a second color coordinate system, providing a transformation between the first color coordinate system and the second color coordinate system, employing the transformation to transform the digital representation of the color image into a transformed digital representation of the color image in the first color coordinate system and employing the image processing device to modify the transformed digital representation of the color image.

Additionally, in accordance with a preferred embodiment of the present invention, the digital representation is provided by an input device. The second color coordinate system is the coordinate system of the input device.

Furthermore, in accordance with a preferred embodiment of the present invention, the step of employing the transformation is performed by a device having the second color coordinate system. Alternatively, the step of employing the transformation is performed by the image processing device.

There is further provided, in accordance with a preferred embodiment of the present invention, an image processing device having a first color coordinate system including apparatus for receiving a digital representation of a color image defined in a second color coordinate system, transformation construction apparatus for providing a transformation between the first color coordinate system and the second color coordinate system and apparatus for employing the transformation to transform the digital representation of the color image into a transformed digital representation of the color image in the first color coordinate system. The image processing device is operative to modify the transformed digital representation of the color image.

Additionally, in accordance with a preferred embodiment of the present invention, the digital representation is provided by an input device.

Further, in accordance with a preferred embodiment of the present invention, the second color coordinate system is the coordinate system of the input device.

Finally, in accordance with a preferred embodiment of the present invention, the transformation construction apparatus form part of a device having the second color coordinate system.

BRIEF DESCRIPTION OF THE DRAWINGS

The present invention will be understood and appreciated from the following detailed description, taken in conjunction with the drawings in which:

FIGS. 4A–4E are schematic illustrations of a technique for restoring an input copy from an output copy in accordance with a preferred embodiment of the present invention;

FIGS. 10-1–10-3 is a flow chart illustration of a CMY-CMY conversion technique useful in the technique of FIG. 9;

DETAILED DESCRIPTION OF PREFERRED EMBODIMENTS

Figure 1A:
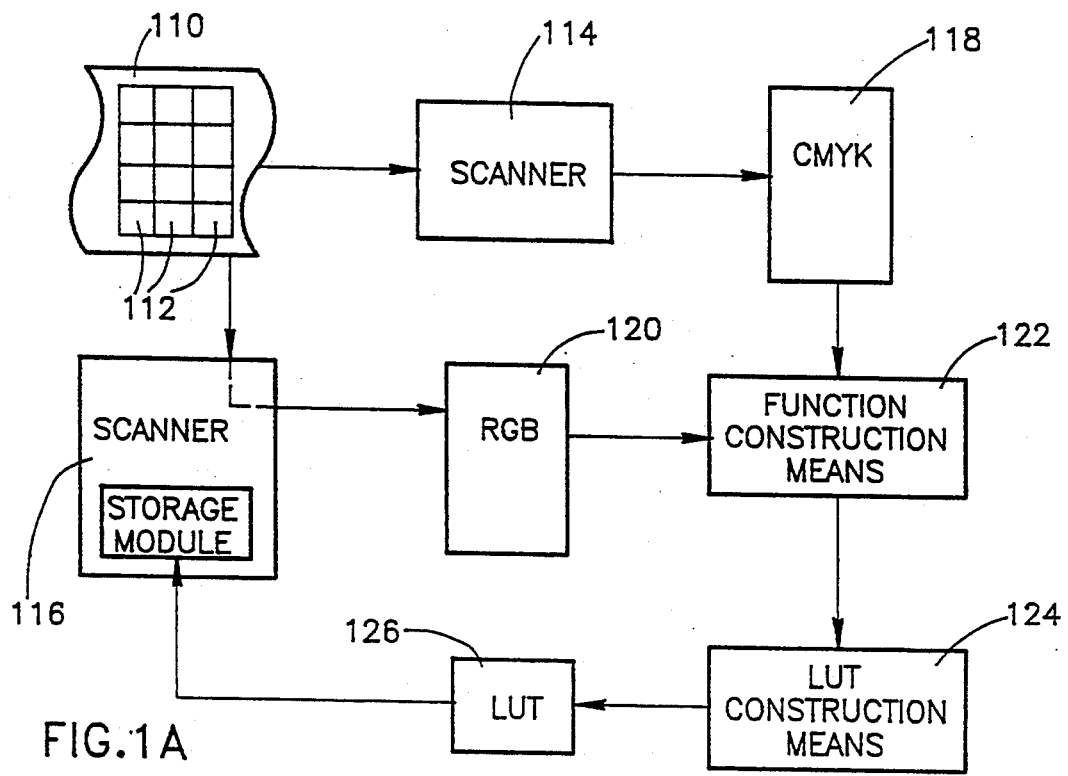
FIGS. 1A and 1B are schematic illustrations respectively of the generation of a calibration transformation or function and its employment in the incorporation of a new color separation scanner or other color reading device into an existing reproduction system employing automatic calibration in accordance with a preferred embodiment of the present invention.

It is an object of the present invention to provide a technique for multidimensional and preferably full range calibration of graphic arts reproduction apparatus, which simplifies and greatly expedites the process of calibration of graphic arts reproduction apparatus to faithfully reproduce desired tone and color. The calibration is accomplished by:

(a) providing a database comprising a set of color values representing a colored image which it is sought to reproduce by using output apparatus employing a plurality of inks or other colorants in amounts defined by the set of color values; and (b) computing a color calibration function or transformation which fits the database and allows accurate interpolation procedures to be carried out on all color values which are reproducible by the apparatus employed, although only a subset of these values were included in the original database. The function also preferably allows accurate extrapolation procedures to be carried out on color values which fall outside of the convex hull spanned by the color values in the database. Preferably, the function is stored as a look up table (LUT). Alternatively, it can be stored in any other suitable form, such as an analytic formula, etc.

The step of computing a color calibration function

A mathematical formulation of the problem is as follows: given a set of p points defined in a d-dimensional input space and given n sets, each comprising p scalars, to which scalars the points respectively correspond. Each set is contained within a unidimensional space, the n unidimensional spaces corresponding to the n coordinates defining the output space Find n relatively smooth functions $f_1 \ldots f_n$ from the d-dimensional space to each of the n unidimensional spaces, such that each of the functions generally fits the data, thereby to allow generally accurate interpolation.

For example: $p=1676$, $d=3$, $n=4$. The p points are 1676 RGB values read by a color reading device, each value being an ordered 3-member set (r, g, b) defining the respective quantities of Red, Green and Blue detected at each of 1676 locations upon a multicolored input image which is to be read. The values r, g and b are scalars and $0 <= r, g, b <= 255$. Each of the p points of the multicolored input image is to be represented by an output image using Cyan, Magenta, Yellow and Black inks (which define four unidimensional spaces), in quantities respectively represented by positive variables c, m, y and k. Four functions, each defined from the three dimensional (r, g, b) space to a respective one of the four one-dimensional c, m, y and k spaces, are to be computed, which will respectively determine the quantity of each of the four inks which is to be provided to reproduce any particular color (r, g, b).

Any suitable device can be employed to "read" the color values of the database in any of the various embodiments described herein. Inter alia, any of the following devices may be employed: colorimeters, analog electronic color separation scanners, digital electronic color separation scanners, densitometers, spectrum analyzers.

Any suitable color reading device may be used as a calibration reference, such as the Smart Scanner available from Scitex. In some applications, such as Application No. 2 described hereinbelow, it may be desirable to use a scanner whose colorimetric response is similar to that of the human eye, or a scanner whose colorimetric response is mathematically transformable to a response similar to that of a human eye. Any coordinate system suitable for the particular application may be used to represent the color values (XYZ, RGB, etc.). Preferably, substantially all of the colors of the reference color space should be distinguishable by the device used as a calibration reference.

The procedure disclosed hereinbelow is relatively insensitive to the selection of the particular set of p points. In particular, the selected points need not be arranged at regular intervals and do not even need to be distributed homogeneously. However, it is generally preferable to provide a minimum density of data distribution throughout the color space or subspace of interest.

A preferred procedure for computing each function is as follows:

a. Define a set of boxes in the d-dimensional input space. The boxes are preferably selected to be of more than one size, preferably of two different sizes. The set of boxes of each particular size covers the entire d-dimensional space, preferably with overlap. Preferably, the length of the side of each box will be 1/16 to $\frac{1}{2}$ of the length of each dimension of the d-dimensional input space, and the boxes will be defined such that the centers thereof are spaced at intervals which are half of the lengths of the sides of the boxes.

For example, and with reference to the numerical example outlined above with eight-bit color values, $d=3$ and the d-dimensional space is the (r,g,b) cube $[0,255]^3$. In this instance, two sets of boxes may be defined. Each of the $5^3$ boxes in the first set is of dimensions $128^3$, and each of the $9^3$ boxes in the second set is of dimensions $64^3$. Boxes of the first set may be defined throughout the cube at intervals of 64 units along each of the three dimensions, beginning at the origin (0, 0, 0). Boxes of the second set may be defined throughout the cube at intervals of 32 units along each of the three dimensions, beginning at the origin (0, 0, 0). If a box defined as above is not entirely contained within the d-dimensional space (such as the boxes whose centers are at the origin only $\frac{1}{8}$ of which are contained within the d-dimensional space), the box is defined as the overlap of the box (when defined as above) with the d-dimensional space. For example, the first box in the first set will be $[0, 64]^3$.

b. Approximate the transformation within each box by computing a function from that box to the (c,m,y,k) space which optimally fits the data points within that box. Any suitable curve fitting method may be used, such as the methods described in chapter 4 of J. Stoer, *Introduction to Numerical Analysis*, Springer-Verlag, New York, 1980.

If linear approximation methods are used, it is desirable, in the present example, that there be at least 10 points in each box of dimensions $64^3$, including those boxes which are only partially contained within the d-dimensional space, such as the box whose center is at the origin. Therefore, there should preferably be a more dense distribution of points near the periphery of the d-dimensional space.

c. For each of the p points in the input space (or, if the function is stored in LUT form, for each of the LUT points), define the function at that point as a weighted sum of all the approximating functions from all the boxes (some of the weights may be zero). The weight assigned to each approximating function in the weighted sum typically decreases with the size of the corresponding box and with the distance between the center of the corresponding box and the point and increases with the number of points contained within the corresponding box. According to one preferred embodiment of the present invention, a nonanalytical function may be used. According to a further preferred embodiment of the present invention, an analytical Formula may be used. One such analytical formula giving the weight for the value of the approximation function $f_i$ derived from box i at a point $x_j$ in j is:

$$\text{weight}(f_i, x_j) = \frac{(\text{number of points in box } i)}{(\text{volume of box } i) \times (\text{distance of point}^2 \ x_j \text{ from center of box } i)}$$

The weights are non-negative. For each $x_j$, they sum to unity over the totality of boxes of all sizes.

These computations may be performed by any suitable computer or by a suitable digital electronic color separation scanner such as the Smart Scanner available from Scitex. Appendix A is a computer listing of a procedure which inputs a plurality of p d-dimensional color values and a plurality of sets containing p scalars each, and uses the above method to output a color calibration LUT in accordance with a preferred embodiment of the present invention.

Alternative procedures for computing each function $f_1 \ldots f_n$ are:

1. Using a regular grid to order the input or output data, and inverting one of the transforms, as disclosed in the above-referenced article by Stone et al, the disclosure of which is incorporated herein by reference; or 2. Using iterative methods to optimize a sample of the values of the function. Iterative methods are described in chapter 8 of J. Stoer, *Introduction to Numerical Analysis*, Springer-Verlag, New York, 1980.

It is noted that the above procedures are merely illustrative of the type of mathematical procedures which could be used to compute color calibration functions or transformations having the characteristics specified above.

The step of providing a database

As stated hereinabove, the method of the present invention includes the step of providing a database comprising a representation of a plurality of colors, which database may then be processed by color processing apparatus. To continue the above numerical example, the original database, whose characteristics can be directly controlled by the operator, are the unprocessed RGB values and these values may be recorded, e.g. on a transparency, and then scanned. The data which forms the basis for the function construction procedure described above will then be the processed data, i.e. the transformed form of the original database obtained by processing (recording and scanning) the original database.

It is therefore appreciated that a "good" database for sampling the operation of color processing apparatus over a range or subrange thereof has the property that, once processed by the color processing apparatus, it will, for generally any region of a predetermined size overlapping or contained within the range or subrange, include at least a predetermined number of color values located interiorly of that region. A more general requirement for a "good" database is that, once processed, it is of a predetermined degree of closeness to a "target" comprising a predetermined plurality of color values. However, it is generally the case that if a database which possessed this property prior to being processed is subsequently processed by the color processing apparatus, the processed data will no longer possess the desired property but rather will be "distorted" due to the transformations of the data induced by the color processing procedure.

The color calibration function computation procedure described above can be used in accordance with the method described hereinbelow to produce a "good" database, in the sense set forth hereinabove, from an initial database which may be far from possessing the desired characteristic set forth hereinabove. According to one preferred embodiment, the initial database, prior to being processed by the color processing apparatus, comprises a set of points distributed generally evenly throughout generally the entirety of the domain of the apparatus.

The improvement process of the initial database may, if desired, be continued iteratively until any desired degree of "quality", in the sense described hereinabove, of the final database, is attained. Typically, only three or less such iterations are necessary.

A preferred method in which the function construction procedure described hereinabove is used to provide an improved database will now be described with reference to FIGS. 7A–7B, which are schematic illustrations of the steps of the method. Each of steps (a)–(e) of the method is designated in FIG. 7A by the appropriate letter. Step (f) is illustrated in FIG. 7B.

Figure 7A:
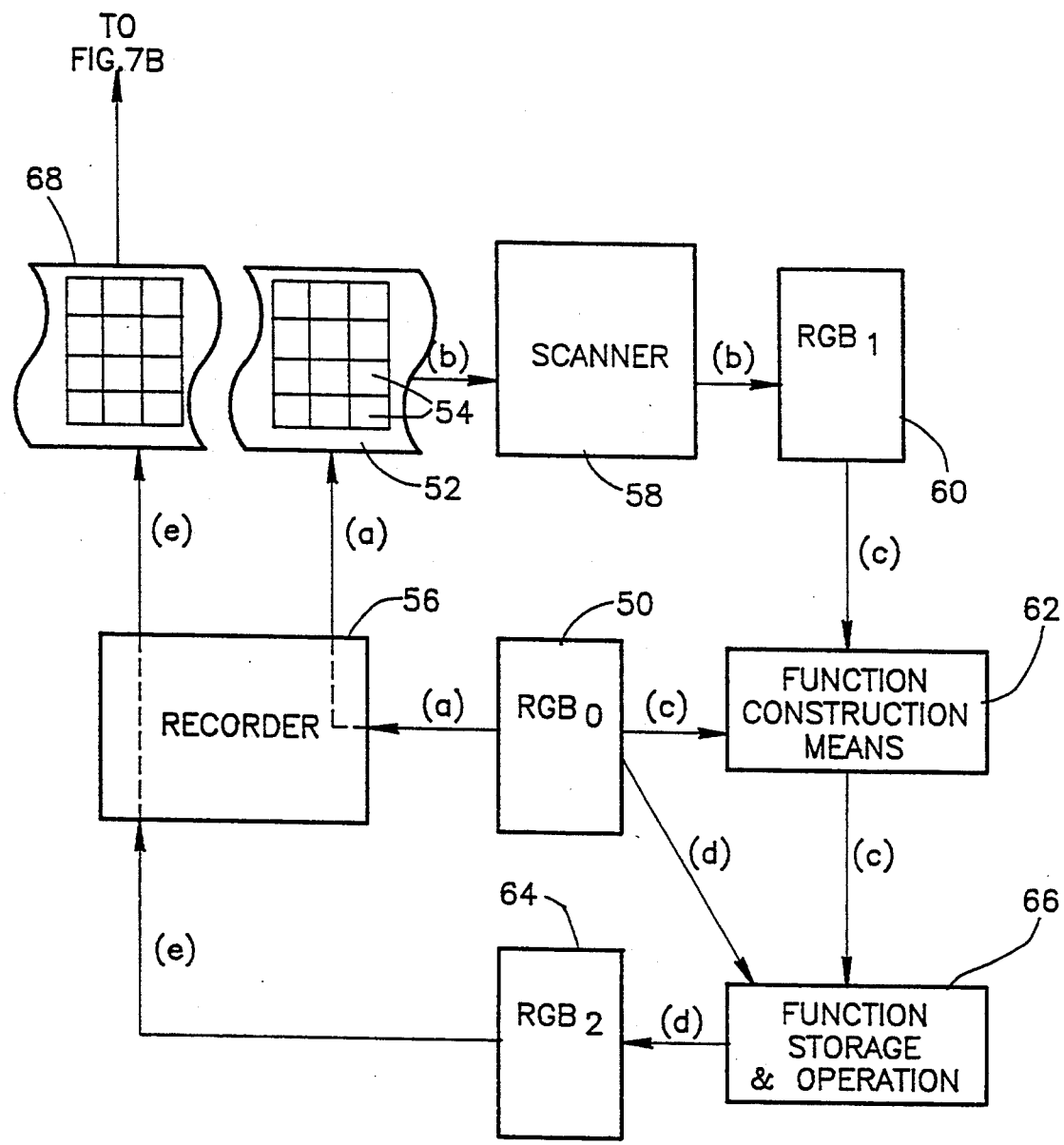
FIGS. 7A–7B are schematic illustrations of a reiterative method for providing an improved database for sampling the color processing characteristics of color processing apparatus.
Figure 7B:
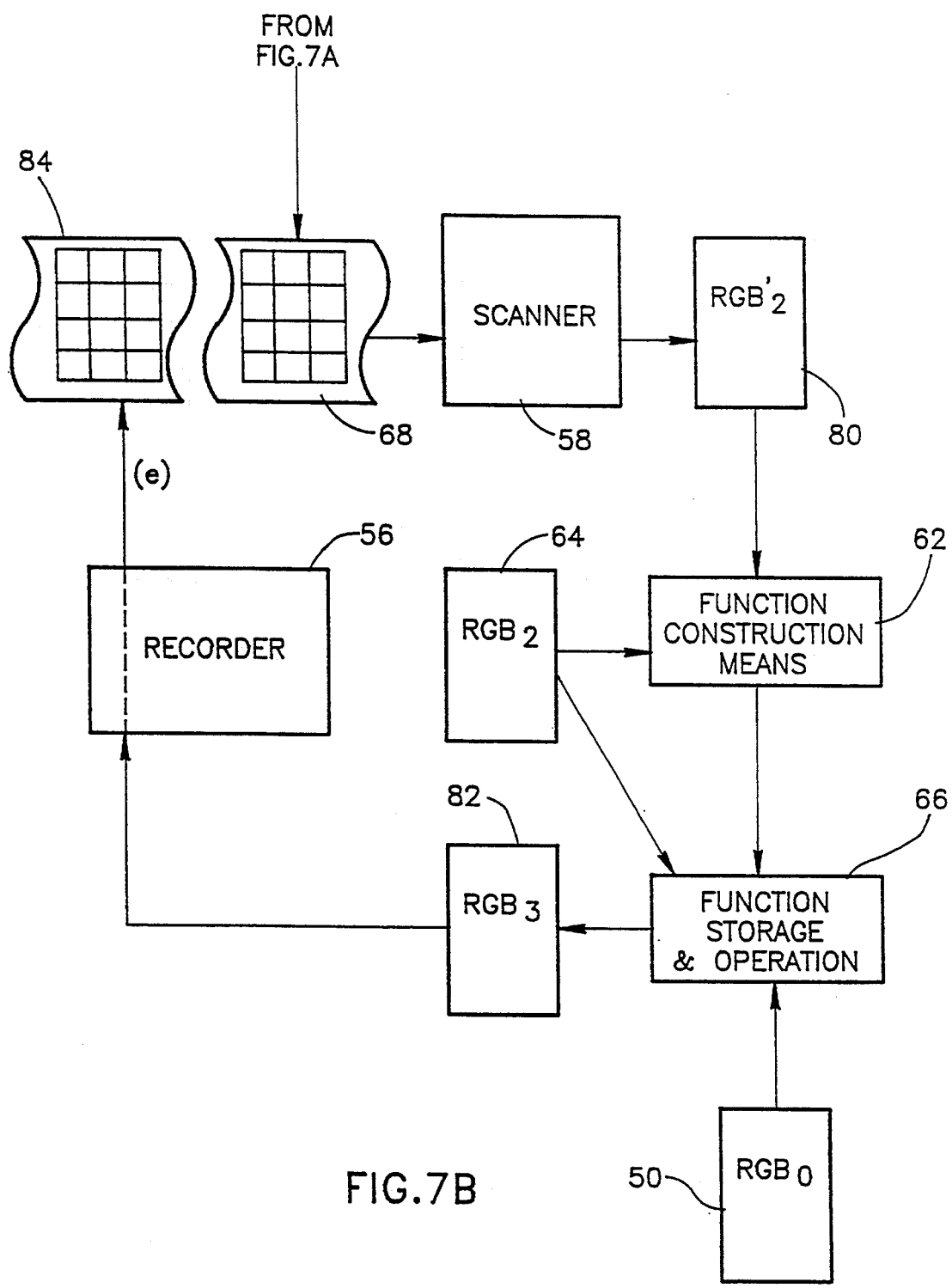

It is appreciated that the method of FIGS. 7A–7B may be employed to construct a first database which, once processed by given color processing apparatus, provides a second, processed database which defines a plurality of color values, each of which is substantially equal to a corresponding one of any predetermined "target" plurality of color values physically obtainable by means of the color processing apparatus. The steps illustrated in FIG. 7A are as follows:

(a) Provide an initial digital representation 50 of a colored image, the colored image comprising a plurality of colored locations. The digital representation 50 comprises a plurality of color values such as RGB values, to be referred to as "$RGB_0$ data" which corresponds to the plurality of colored locations. An example of a preferred initial database 50 useful in deriving a final database for using a Smart Scanner (commercially available from Scitex Corporation, Herzlia, Israel) for sampling the operation of a 4cast color recording device (commercially available from DuPont) is disclosed in Appendix C. The corresponding final database, provided in accordance with the method of FIGS. 7A–7B, is disclosed in Appendix D.

Record the $RGB_0$ data with a color recording device 56 (such as a 4cast, commercially available from DuPont) to obtain an analog representation 52 of the colored image comprising a plurality of colored locations 54. Preferably, the initial digital representation 50 of the initial colored image will span generally the entirety of the color coordinate system defined by the color recording device.

(b) Read the image 52 using desired input apparatus 58, thereby defining a plurality 60 of color values such as RGB values, to be referred to as "$RGB_1$ data", which correspond to the plurality of colored locations 54. It is noted that, generally, the $RGB_1$ data obtained from the original $RGB_0$ data by recording and scanning will no longer have the same values as the original $RGB_0$ data. If the values of the $RGB_1$ data are not sufficiently close to a "target" predetermined plurality of color values, follow steps (c) to (f) below:

(c) Compute a function $f_1$ from the $RGB_1$ data 60 to the $RGB_0$ data 50 by pairing each $RGB_1$ datum with the value of the corresponding $RGB_0$ datum and by using the color calibration function construction method described hereinabove. The computation and storage of the color calibration function may be performed by any suitable computation means 62 and storage means 66 respectively. Two software implementations of computation means 62 in conjunction with storage means 66 are disclosed herein as Appendix A (hardware environment: Prisma System workstation, commercially available from Scitex) and Appendix B (hardware environment: Smart Scanner, commercially available from Scitex).

(d) Define $RGB_2$ data 64 by operating $f_1$ on each of the $RGB_0$ values. The $RGB_2$ data is a digital representation of an "improved" database (relative to the initial $RGB_0$ database) in the sense described hereinabove with reference to the term "good" database. The operation of function $f_1$ on the data 50 may be performed by any suitable means 66, such as the Scitex Smart Scanner of any conventional computer such as an IBM PC.

(e) If an analog representation of the improved database is desired, output the $RGB_2$ file 64, which may be stored by any suitable means, such as the storage module of the Smart Scanner, using color output device 56 as a color printing device and using a substrate 68 of a medium generally identical to the medium of the substrate 52.

(f) If it is desired to continue the above procedure to obtain a still further improved database, i.e. a database whose values ape still closer to the "target" predetermined plurality of color values, continue as in FIG. 7B: Provide a digital representation of the output 68 of (e), as in (b), using input apparatus 58, thereby defining a plurality of color values such as RGB values, to be referred to as "RGB'$_2$data" 80.

Define a function $f_2$ from the RGB'$_2$ data 80 to the RGB$_2$data 64 and store it in module 66, as in (c) above.

Define and store RGB$_3$ data 82 by operating $f_2$ on each of the RGB$_2$ values 64, as in (d) above.

If desired, output the RGB$_3$data file, as in (e) above. The resulting picture 84 is an analog representation of the still further improved database.

The reiteration or loop of FIG. 7B may be repeated as many times as desired to cause the resultant database to approach the "target" predetermined plurality of color values to any desired degree of closeness.

It is appreciated that the method of providing a data base and the method of computing a color calibration function, both as shown and described hereinabove, have a wide variety of applications when used independently or in conjunction with one another. For example, the method of providing a database described hereinabove is useful not merely for the purpose of computing a color calibration function as described hereinabove, but also in any situation in which it is desired to sample the functioning or the characteristics of color processing apparatus, e.g. in quality control and repeatability test situations such as those presented in the foregoing examples. It is appreciated that the foregoing examples are merely illustrative of possible applications in which it is desired to sample the functioning or the characteristics of color processing apparatus.

Example A: A typical situation in which the method of providing a database as shown and described hereinabove is useful in quality control is that of a printing machine or other output apparatus which is found to produce somewhat varying output as a function of fluctuating environmental factors. A database designed to sample the characteristics of the printing machine, constructed in accordance with the method shown and described hereinabove, may be printed periodically on the printing machine. The database is preferably constructed to sample the printing of colors which are known to be sensitive or problematic when printed on that particular machine. The hard copy is then scanned and a suitable color calibration function is constructed to compensate for any drift which may have occurred relative to a previously defined standard.

Example B: The method of providing a database may also be useful in quality control of color reading apparatus such as scanners. For example, if a scanner is thought to be defective, a database designed to sample the characteristics of that scanner, constructed in accordance with the method shown and described hereinabove, may be scanned by the putatively defective scanner and the result compared to the results of scanning the same database using results from a scanner known to be properly functional. The database is preferably constructed to sample the scanning of colors which are known to be sensitive or problematic when scanned on that particular scanner.

It is appreciated that the above examples are merely illustrative of possible quality control applications. The term "quality control" is here employed to describe any application in which the quality of performance of color processing apparatus is of interest. More generally, it also applies to any situation in which it is of interest to sample the performance of color processing apparatus.

Example C: A typical situation in which the method of providing a database as shown and described hereinabove is useful in repeatability control is that of a scanner which is suspected of being improperly functional for a certain subregion (or the entire region) of the output space, comprising a plurality of colors. The database provision method shown and described hereinabove may be employed to provide a transparency or other representation which, when scanned, will be mapped the onto subregion in question. This transparency may be used to test the scanner and effect suitable corrective procedures thereupon. It is appreciated that this example is merely illustrative of possible repeatibility control applications. The term "repeatibility control" or "repeatibility testing" is here employed to describe any application in which the repeatibility of performance of color processing apparatus over time and/or over changing environmental conditions is of interest.

A number of applications of the method of computing a color calibration function, preferably in conjunction with the method of providing a database, both methods as shown and described hereinabove, will be described in detail herein, however, they are intended to be merely illustrative of the range of possible applications.

It is appreciated that only one or a few embodiments of each of the applications disclosed is described in detail hereinbelow, and that the details of implementation described herein are merely illustrative and by way of example, and that the embodiments described herein may be modified in any suitablemanner. For example, any of the applications herein may be implemented on any suitable computer, such as an IBM PC, by performing the required transformation on the digital output file of any ECSS. Measurements of the database may be carried out automatically, as disclosed herein, or manually, using any suitable equipment such as a spectrum analyzer. The measured data may then be input into the computer either automatically or manually.

Application #1: Calibration of a first color scanner with reference to a second color scanner Reference is now made to FIGS. 1A and 1B which illustrate respectively the generation of a calibration transformation and its employment in the incorporation of a new digital electronic color separation scanner into an existing reproduction system employing automatic calibration in accordance with a preferred embodiment of the present invention.

Conventionally, an existing reproduction work shop that purchases a new electronic color separation scanner (CSS) already owns one or more CSSs. During years of work and interaction with their customers, the shop has developed its own unique tone and color reproduction parameters that characterize the reproductions they produce. The tone and color reproduction parameters may depend on at least the following factors:

The type of originals employed, i.e. the brand and type of transparency or reflective copy;

The color separation scanner employed and its calibration;

The plotting system employed;

The printing system employed; and

Aesthetic considerations.

The introduction of a new ECSS normally changes the tone and color reproduction parameters that are realized. A long and tedious process of adjustment of the new ECSS is normally required, involving numerous adjustments by trial and error. Normally the tone and color reproduction parameters existing prior to introduction of the new ECSS are never fully realized.

In accordance with the present invention, the trial and error techniques currently in use are replaced by a fully- or, if desired, semi-automated well-defined and generally algorithmic technique.

In accordance with a preferred embodiment of the present invention, as illustrated in FIG. 1A, there is provided a substrate, such as a transparency, bearing an analog representation of a colored image 110 which typically comprises a plurality of colored locations 112. Preferably, the colored image will comprise a "good" database constructed in accordance with the database provision method shown and described hereinabove. Here a "good" database is one which, once scanned by the scanner 114 of FIG. 1A, has a predetermined pattern such as a pattern in which there is a minimum density of data in every area of interest. The predetermined pattern may, for example, be a generally even distribution throughout generally the entirety of the physically producible color space, if it is desired to sample generally the entirety of the color space. Therefore, when constructing the colored image 110 in accordance with the database provision method of FIG. 7, the scanner 114 should preferably be used to scan the colored image 52. Alternatively, scanner 116 can be used.

The colored image 110 is scanned both by an existing ECSS 114 which it is sought to emulate and by the new digital ECSS 116. From the existing ECSS 114 a digital representation 118, comprising color values (preferably CMYK values) each corresponding to an individual one of the locations 112, is obtained. These values relate to the amounts of each colorant to be provided by a printing machine.

From the DECSS 116, a digital representation 120 of the locations 112, comprising color values (preferably RGB values) corresponding to each location 112 is provided. These values correspond to the color separations.

It is appreciated that references to RGB values and CMYK values, etc. throughout the present specification are intended to be examples of suitable color coordinates which can be replaced by any other suitable color coordinates, such as XYZ coordinates. Furthermore, there need not be exactly three input dimensions, or exactly three or four output dimensions. Any suitable number of dimensions may be employed.

Function construction means 122 receives pluralities of corresponding color values 118 and 120. Function construction means 122 is constructed and operative to compute a color calibration function from the color values 120 to the color values 118 in accordance with the color calibration function computation procedure shown and described hereinabove. The color calibration function computed by function construction means 122 is received by LUT construction means 124. LUT construction means 124 is operative to construct a LUT 126 relating the colorant values 118 to the RGB values 120 and to store the LUT 126, such as in the TCR module of the scanner 116. Software implementations of function construction and "on the fly" LUT construction are disclosed in Appendices A and B.

It is appreciated that function construction means and LUT construction means referred to throughout the present specification may be formed as a single unit, e.g. as a computer program which, for each point, computes the function at each point and then stores the point in a LUT "on the fly" before continuing to the next point.

As a result of the foregoing technique, an input of any particular input material to the DECSS will produce DECSS outputs with substantially identical CMYK values as those produced on the existing ECSS from the same input material.

Figure 1B:
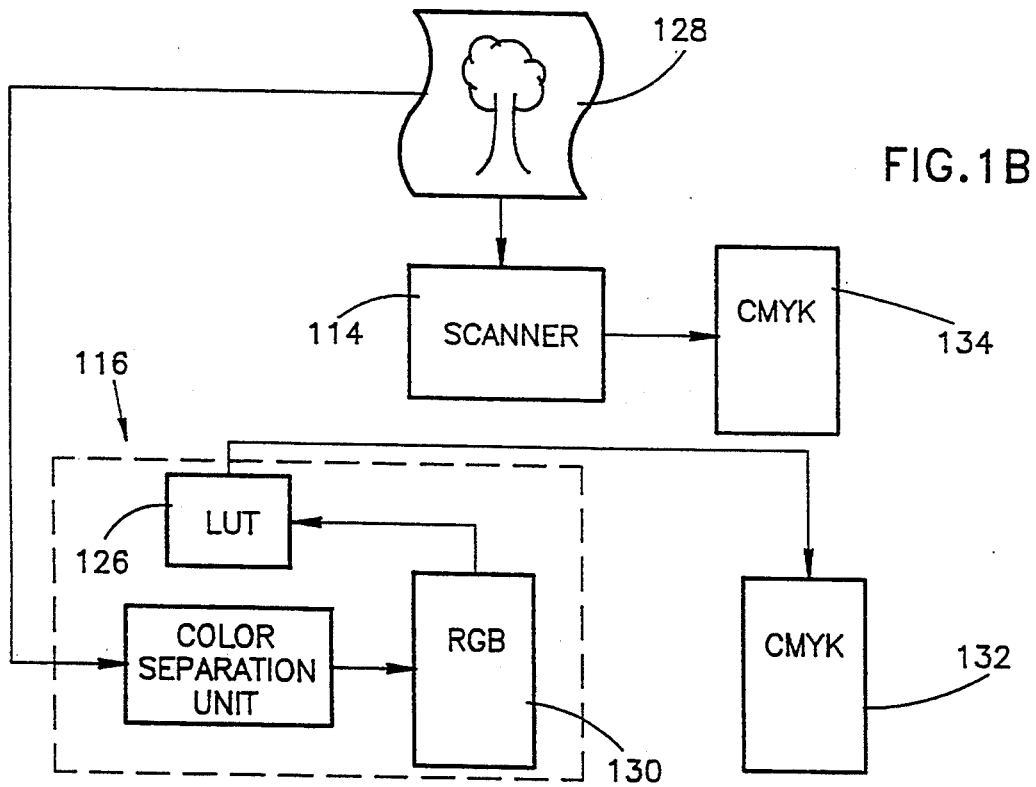

FIG. 1B illustrates the reproduction of input material using the existing ECSS 114 as opposed to the calibrated DECSS 116. The DECSS 116 scans the input 128, resulting in a first digital representation 130 thereof, which is then converted by the LUT 126 into a second digital representation 132 thereof, representing the required amounts of each colorant. It is seen that the digital representation 134 of the image 128 resulting from scanning by the ECSS 114 will normally be substantially identical to the output 132, as scanned by the DECSS 116.

Color values of the first digital representation which do not appear in the LUT 126 may be interpolated therefrom, using standard methods, such as those disclosed in chapter 2 of J. Stoer, *Introduction to Numerical Analysis*, Springer-Verlag, New York, 1980.

It is appreciated that the same or similar interpolation methods may be used in all of the applications of the present invention shown and described subsequently. The interpolation methods are preferably carried out automatically by suitable hardware, such as that commercially available from Zoran Corporation, Santa Clara, Calif., U.S.A., or from INMOS Limited, Bristol, UK.

In accordance with the embodiment of FIG. 1A, the ECSS 114 output of color values 118, corresponding to the color patches 112, can be stored as a digital file and can be transmitted to function construction means 122 by any suitable technique, such as via a cable connection, or by employing magnetic tape or other medium.

The above-described technique is not limited to automatic reading of colorant values. These values may be manually read one by one from the scanner. The operator may then input into the function construction means 122, as via a keyboard or via any other suitable input means, a list of RGB values and corresponding colorant values. A suitable software program may then be activated that will create the color calibration function and a look up table (if desired). The LUT may be stored in the memory of the DECSS.

Application #2: Output To Output Calibration

Figure 2A:
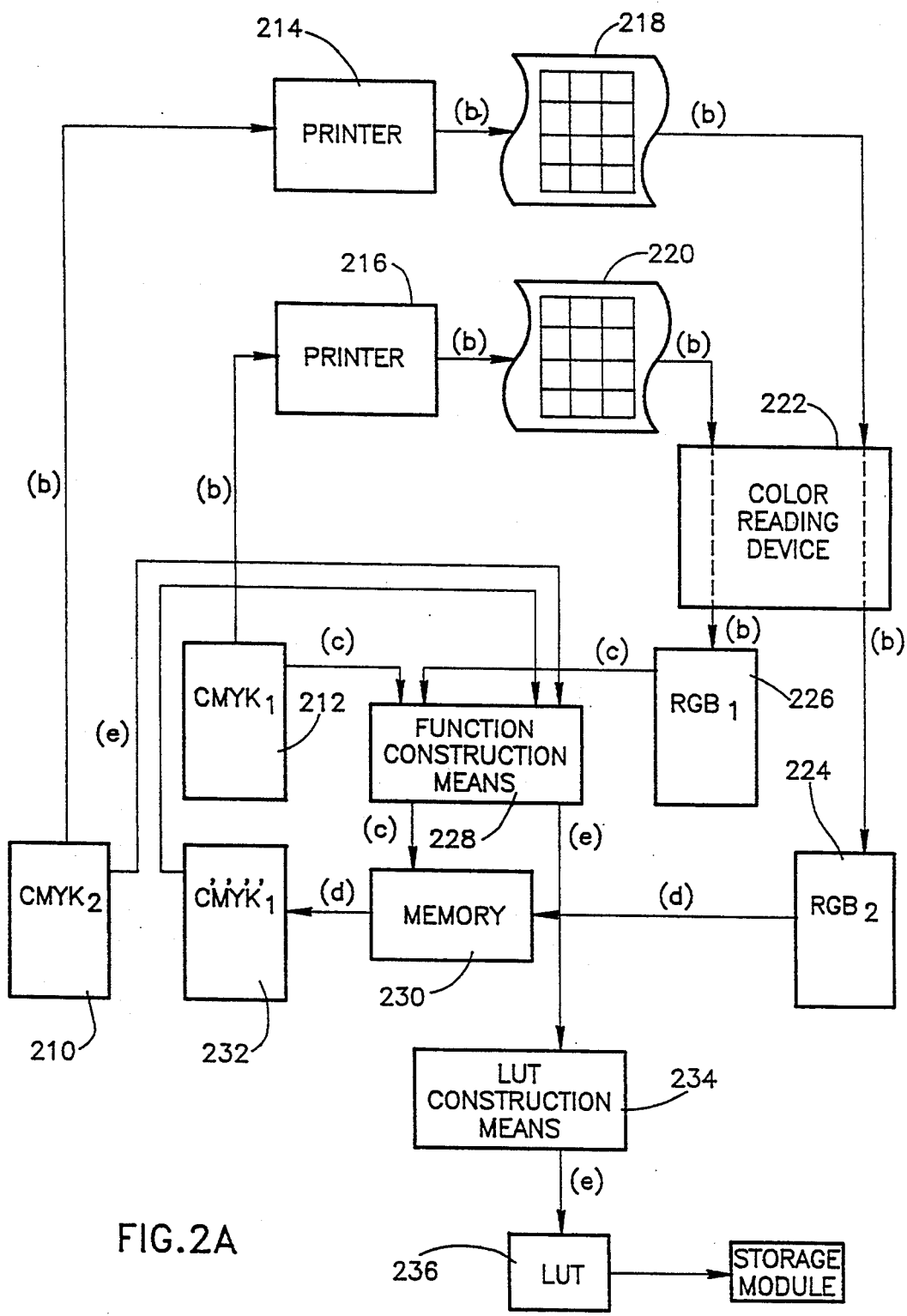
FIG. 2A is a schematic illustration of compensation for a new printing or proofing machine in accordance with a preferred embodiment of the present invention.

Reference is now made to FIG. 2A which is a schematic illustration of calibration procedures for producing a first printing system output substantially identical to the output from a second printing system.

The embodiment of FIG. 2A is particularly useful in calibrating a proofing machine, used to prepare a single copy of a reproduction For preliminary proofing purposes, to emulate a printing machine which it is intended to use to produce the final reproduction. The state of the art technology, such as the Cromalin (registered trademark) system available From DuPont (U.K) Limited, Hertfordshire, UK, produces a reproduction which may differ substantially from the output of the printing machine that the proofing system is intended to emulate. Consequently, the proof must be evaluated by an expert who can judge the quality thereof while attempting to mentally adjust for the expected discrepancies between proof and eventual printed reproduction. The present invention enables the proofing machine to be accurately and algorithmically calibrated so as to emulate the printing machine.

Since there may exist colors that can be printed by the final printing machine but cannot be printed by the proofing machine using any combination of colorants, it is desirable to choose a proofing machine that is compatible with the printing machine. For example, the Cromalin (registered trade mark) proofing system available from DuPont is generally compatible with offset printing machines. Otherwise, "unprintable" colors may be dealt with using any suitable technique, such as the techniques described in the above-referenced article by Stone et al (particularly pages 275–279 thereof), the disclosure of which is incorporated herein by reference.

A further application is when a printing machine needs to be replaced or when it is desired to add an additional printing machine to an existing workshop. Since the new machine may be of a different brand, type or model than the old machine, it is typically found that printing with the same colorant values on the new machine will produce a color with a different appearance. Therefore, it is generally the case that the new printing machine must be adjusted manually, by a trial and error process, until the reproductions obtained therefrom roughly resemble the reproductions obtained from the existing machine. It is typically impossible to obtain complete concordance between the appearances of the reproductions produced by the first and second machines.

The different appearances obtained from different printing or proofing machines may be the result of at least the following reasons: different colorant materials employed, different technologies employed (offset, gravure, web, Cromalin (registered trade-mark), ink-jet, heat transfer, etc.), dot shape of half-tone film or plates, room temperature, humidity, etc.

Comparison of the results from the respective printing devices is preferably carried out in a CIE (Commission International d'Eclairage) standard color space but may also be carried out in any other suitable color space.

A preferred procedure for using a graphic arts reproduction system comprising a first printing device as a reference in order to calibrate a graphic arts reproduction system comprising a second printing device is the following, described with reference to FIG. 2A:

a. Provide a first database 210 and a second database 212 for the first and second printing devices 214 and 216 respectively. The two databases comprise first and second pluralities of colorant values, preferably CMYK values. Preferably, databases 210 and 212 are "good" databases for sampling the operations of output devices 214 and 216 respectively, in the sense that, once printed by printers 214 and 216 respectively and scanned by the scanner 222, each database has a predetermined pattern such as a pattern in which there is a minimum density of data in every area of interest. The predetermined pattern may, for example, be a generally even distribution throughout generally the entirety of the physically producible color space, if it is desired to sample generally the entirety of the color space.

The two databases are constructed in accordance with the database provision method shown and described hereinabove. When constructing database 210, using the database provision method of FIG. 7, the printer 214 should be used. When constructing database 212, the printer 216 should be used. Preferably, the pluralities of colorant values 210 and 212 include only colorant values that are actually used in reproduction tasks, by printers 214 and 216 respectively.

b. Databases 210 and 212 are printed by printing devices 214 and 216 respectively. The resulting images 218 and 220 respectively are scanned by a color reading device 222 such as the Smart Scanner available from Scitex. The digital representations of images 218 and 220 respectively resulting from the scanning thereof are referenced as 224 and 226. Digital representations 224 and 226 each comprise a plurality of color values, such as RGB values. In some applications it may be desirable to convert the pluralities of RGB values 224 and 226 to corresponding pluralities of CIE XYZ values or values from another suitable coordinate system, using known techniques.

c. Function construction means 228 receives pluralities of corresponding color values 212 and 226 and constructs a color calibration function $f_1$ from 226 to 212. Function construction means 228 is constructed and operative in accordance with the color calibration function computation procedure shown and described hereinabove. The color calibration function $f_1$ computed by function construction means 228 is stored in storage means 230 and represents the amounts of cyan, magenta, yellow and black inks required to print, using printing device 216, a color to be read as a given RGB value by color reading device 222. Implementations of function construction means 228 and of the storage of the resultant function $f_1$ as a LUT are disclosed in Appendices A and B.

d. Function $f_1$ is operated on the $RGB_2$ values of representation 224, resulting in a plurality 232 of CMYK values. For each CMYK value of database 212, the corresponding $C'M'Y'K'$ value in digital representation 232 represents the amounts of the colorants required to produce, by means of printer 216, a colored location which would be read by color reading device 222 as a value substantially equal to the corresponding RGB value in digital representation 224.

e. Function construction means 228 is also operative to receive pluralites of color values 210 and 232 and to compute a color calibration function from the color values 210 to the color values 232. The color calibration function from digital file 210 to digital file 232 is received by LUT construction means 234 and used to construct and store a LUT 236.

LUT 236 therefore represents the conversions of the amounts of cyan, magenta, yellow and black inks required to print using printing device 216, such that the output will appear to the color reading device 222 to be substantially identical to the RGB values read from the unconverted values of c, m, y and k printed by printing device 214.

According to a preferred embodiment, steps (c) through (e) may be performed twice, once exactly as above and once wherein digital representations 210 and 224 replace digital representations 212 and 226 respectively in step (c) and digital representation 226 replaces digital representation 224 in step (d). The resulting plurality of CMYK values will have twice as many values as it did in the previous embodiment, thereby enhancing the accuracy of LUT 236.

According to a first preferred embodiment, when scanning image representations 218 and 220, the white point is selected to be as close as possible to the white-point CMY values of the corresponding printers 214 and 216 respectively. If the selected white point cannot coincide exactly with the corresponding white-point CMY value, a slightly higher white point is typically selected. All other controls are put on their default setting.

According to an alternative preferred embodiment, the white-point is taken on a blank portion of the white paper or background. All other controls are put on their default setting.

It is appreciated that the most appropriate selection of the white point may vary as a function of the particular application and of the particular graphic arts reproduction system employed.

Preferably, colored image representations 218 and 220 are each automatically scanned, thereby to define a plurality of color values corresponding to a plurality of colored locations into which each image is divided. Any suitable procedure may be employed to accomplish this, which procedure may comprise the steps of: automatically passing from pixel to pixel of the colored image while reading and storing the color values of each pixel, defining a plurality of colored locations each comprising a plurality of pixels, and averaging or otherwise combining the values of at least some of the pixels in each colored location, thereby to define a color value for each colored location. A software implementation of a procedure for automatically scanning an analog representation of a colored image is disclosed in Appendix B.

Once constructed, LUT 236 may be utilized in at least two different ways:

(i) If it is desired to print, on printer 216, an image represented as a digital file originally intended for printing by printer 214 so that its appearance to the color reading device 222 will be substantially as when the digital file is printed on printer 214, the digital file is passed through LUT 236 and the resulting transformed digital file is printed on printer 216. The results of printing the digital file on printer 214 and subsequently reading it using color reading device 222 are substantially identical to the results that would be obtained by printing the transformed file on printer 216 and subsequently reading it using color reading device.

Figure 2B:
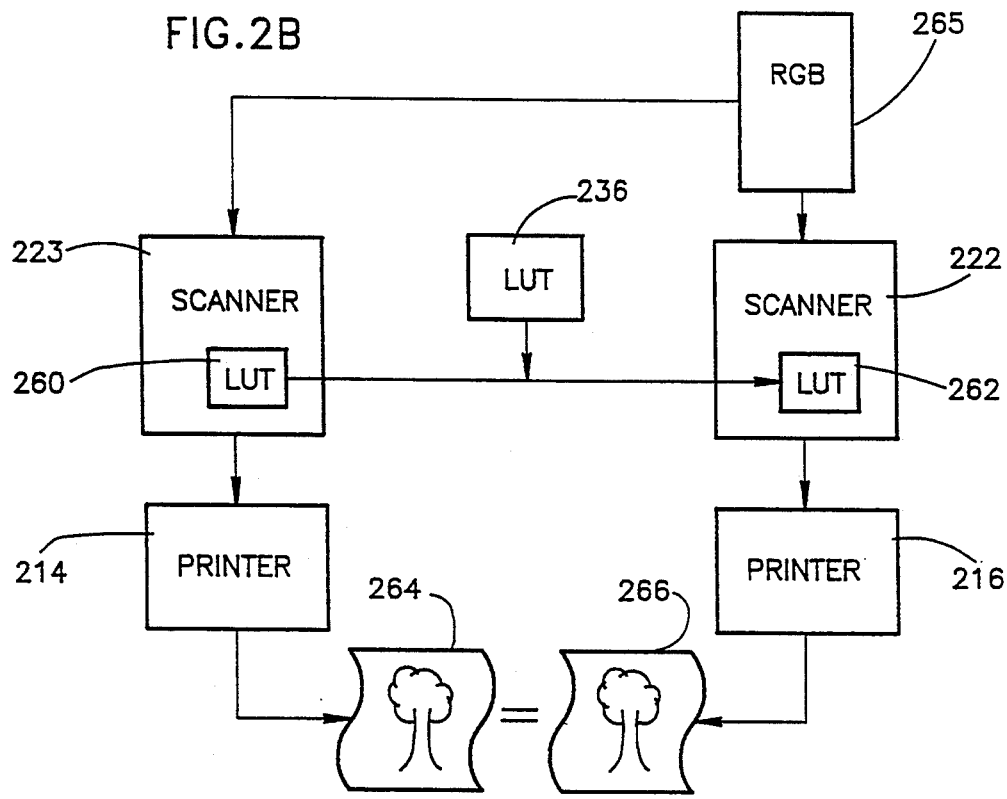
FIG. 2B is a schematic illustration of an alternative method of utilizing the calibration information provided by the technique of FIG. 2A.

(ii) Reference is made to FIG. 2B which illustrates modification of an RGB-to-CMYK LUT 260 incorporated in a color reading device 223 such as a scanner. LUT 260 is suitable for use in conjunction with printing device 214. It is desired to modify LUT 260 and thereby to obtain a modified RGB-to-CMYK LUT 262 which, when loaded onto scanner 223 and used in conjunction with printing device 216 will result in pictures substantially identical to those produced by scanner 223 loaded with LUT 260 and printing device 214, where the term "substantially identical" implies that pictures produced by the two processes will be "seen" as substantially identical by a scanner.

As shown in FIG. 2B, LUT 236 is operated on the values of LUT 260, transforming each CMYK value intended for printer 214 to a CMYK value suitable for printer 216, thereby to obtain LUT 262. Consequently, the result 264 of scanning a particular image 265 using scanner 222 loaded with LUT 260 and subsequently printing with printer 214 are substantially the same as the result 266 of scanning the image using scanner 222 loaded with LUT 262 and subsequently printing with printer 216. This implies that a scanned representation of picture 264 will comprise generally the same values as a scanned representation, using the same scanner, of picture 266.

Figure 8:
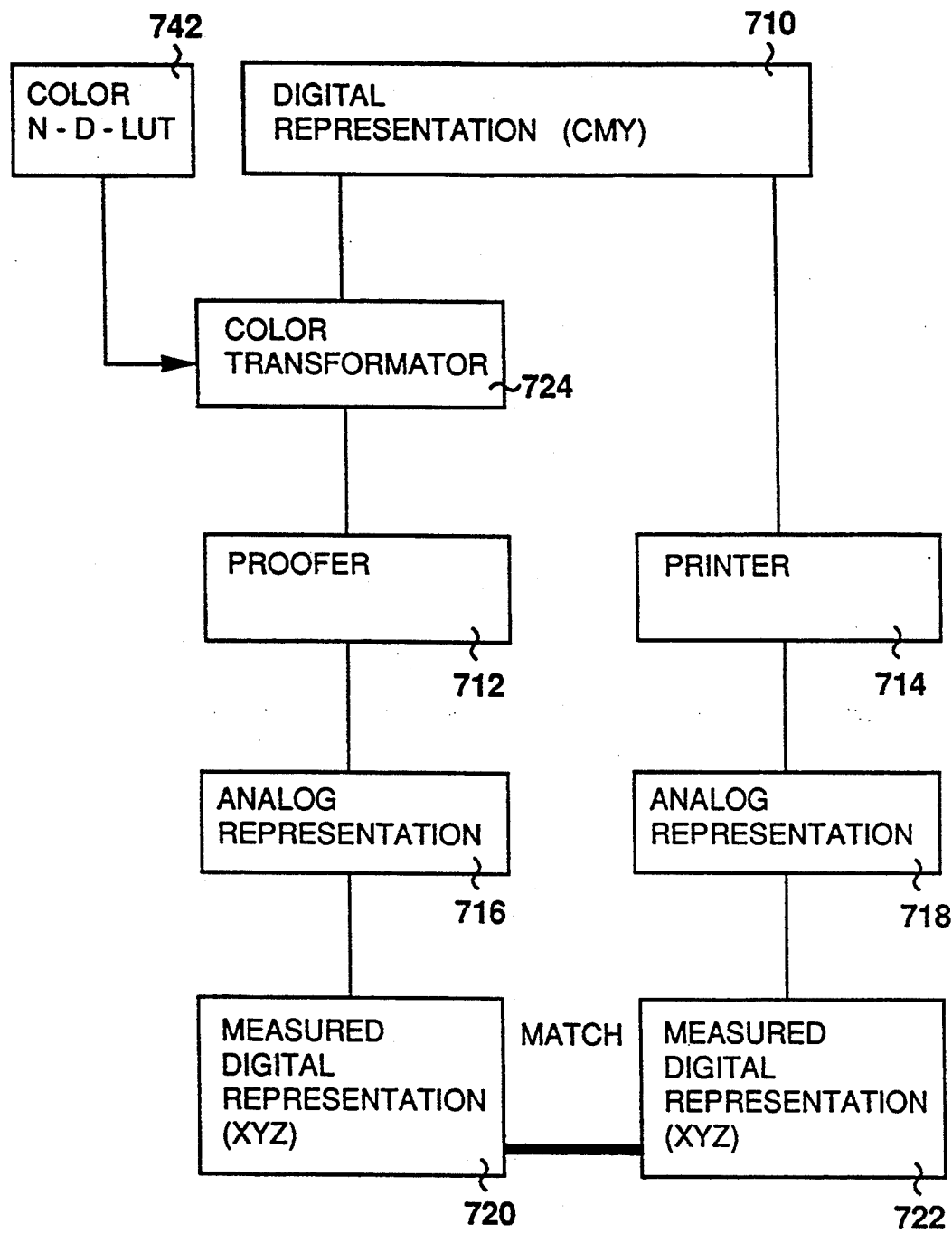
FIG. 8 is an alternative embodiment of a system for performing the method of FIGS. 2A and 2B.

Reference is now made to FIG. 8 which illustrates an alternative embodiment of the output to output calibration.

A digital representation 710 of an image, typically in the CMY color coordinate system but alternatively, in any N-dimensional color coordinate system, is sought to be produced by at least two color reproduction systems, typically a proofer 712 and a printer 714, such that digital representations 720 and 722 of analog representations 716 and 718, respectively, are generally identical. Digital representation 710 is analogous to databases 210 and 212 of FIG. 2A and digital representations 720 and 722 are analogous to digital representations 224 and 226 of FIG. 2A.

Digital representations 720 and 722 are typically produced by a colorimeter or other color measuring system, and are typically in a colorimetric color coordinate system, such as XYZ or $L^*a^*b^*$, or any other measurable N-dimensional color coordinate system. Typically, the three dimensions are the CIE defined coordinate system, such as XYZ or $L^*a^*b^*$, and the remaining dimensions are any which may be desired to be measured, such as non-colorimetric effects seen by a human observer. One such dimension P might be the shininess of each color, or P might be derived from CMYK values using a formula such as:

$$P = K - (C + M + Y)/3 \qquad (1)$$

Formula 1 gives an indication of the amount of black used to produce a given color.

FIGS. 8–11 illustrating this embodiment indicate that the digital representations are in the CMY and XYZ color coordinate systems. It will be appreciated that the present invention is operative for N-dimensional transformations and that the notation CMY and XYZ is by way of explanation only.

It is known in the aft that the two reproduction systems, when input an identical digital representation 710, will generally produce somewhat different analog representations 716 and 718. Since it is generally desired to match the output of one color reproduction system, defined here as the proofer 712, to the output of the other reproduction system, defined here as the printer 714, a color transformation 724 between the CMY color coordinate system of the digital representation 710 to the CMY color coordinate system of the proofer 712 is necessary.

The color transformation 724 typically takes as input an N-dimensional transformation lookup table 742 relating the printable coordinate system of the input digital representation 710 with the printable coordinate system of the proofer 712.

Transformation lookup table 742 can be produced according to the function construction method described hereinabove of, alternatively, in accordance with an alternative function construction method as described hereinbelow with respect to FIGS. 9–11.

Figure 9:
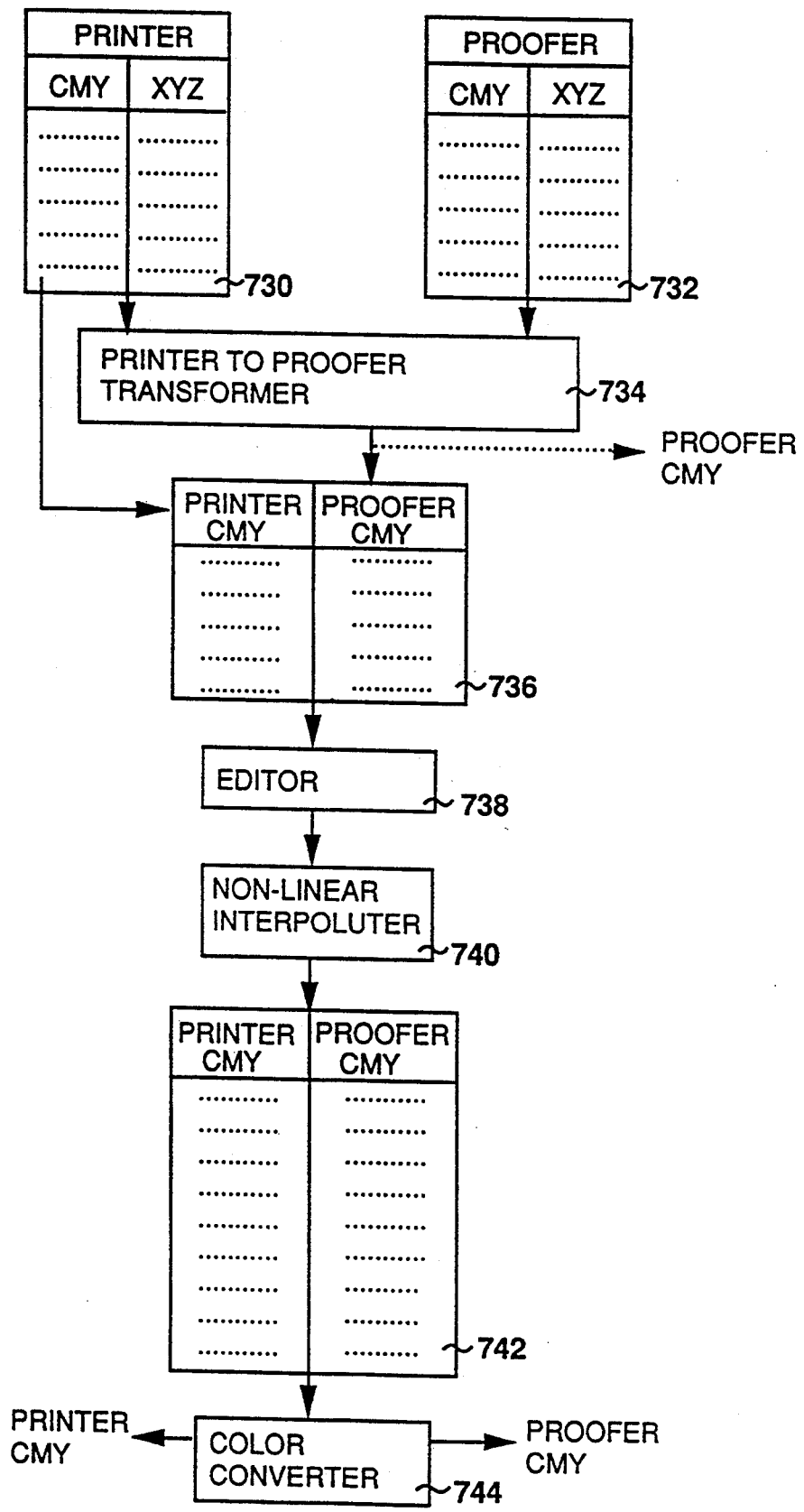
FIG. 9 is a block diagram illustration of a technique for transforming a domain of a first color printing device to a domain of a second color printing device, operative in accordance with an alternative embodiment of the present invention.

Reference is now made to FIG. 9 which illustrates apparatus for performing the alternative method. An N-dimensional color conversion table 730 is built for the printer 714 which converts between a first input digital representation, typically in CMY, CMYK or any N-dimensional printable color coordinate system, and digital representation 722 of the output analog representation 718, in a measurable color coordinate system, such as XYZ or XYZP. Typically but not necessarily, the number of input dimensions is equivalent to the number of output dimensions. Typically the first input digital representation comprises a "good" database, as described hereinabove.

The conversion table 730 is built as follows: the first input digital representation is sent to printer 714 to be printed. The resultant analog representation 718 is measured, via colorimeters or other measurement devices, and the color value of each printed color is stored in conversion table 730 opposite the input digital value which produced it. The precise details of the production of table 730 are given in the manual for the TRANS/4 color converter, manufactured by Scitex Corporation Ltd. of Herzliya, Israel, incorporated herein by reference and set forth in Appendix E. Alternatively, the conversion table 730 can be produced according to the function construction method described hereinabove.

The first input digital representation typically is organized on a N-dimensional grid.

In accordance with the present invention, an N-dimensional conversion table 732 is built for proofer 712 which converts between a second input digital representation, which can be different from the first input digital representation and typically is in a CMY or CMYK or any N-dimensional printable color coordinate system, and a digital representation of an output analog representation produced without the color transformation 724, in a measurable color coordinate system, such as XYZ. The conversion table 732 is built as described hereinabove for conversion table 730. The conversion table 732 is not necessarily built using the same grid as that of table 730. It can be built from any grid or from no grid. Its CMY values can be different from the CMY values used to produce conversion table 30 or they can be identical. Typically but not necessarily, the number of input dimensions is equivalent to the number of output dimensions.

Conversion tables 730 and 732 are input into a printer-to-proofer transformer 734, described in more detail hereinbelow with reference to FIG. 10, for transforming a plurality of printer CMY values to a plurality of proofer CMY values where the XYZ values of the proofer CMY values are generally close to the XYZ values of the printer CMY values. An XYZ value of a CMY value is defined as the XYZ measured from the color produced by the color reproduction system when the CMY value is input to it.

It will be appreciated that the output proofer CMY value does not necessarily appear in conversion table 732.

Printer-to-proofer transformer 734 can be utilized for producing a transformation table 736 of proofer CMY values for each of the printer CMY values of conversion table 730, or, alternatively as shown by a dotted arrow, for producing a proofer CMY value upon input of a printer CMY value. Transformation table 736 is on the same grid as conversion table 730.

Transformation table 736 can optionally be stored in a color converter 744, such as the TRANS/4 color converter, for converting a printer CMY value to a proofer CMY value in accordance with table 736. For any printer CMY value not found in table 736, a linear interpolation is performed on table 736 in order to produce the output proofer CMY value.

Alternatively, the transformation table 736 can be input to an optional editor 738 for editing table 736. Editor 738 can be any kind of editor of text processor and is operative to allow an operator to manually correct the table 736, if necessary.

For example, in a CMY color coordinate system using a 'percent (%) dot' scale indicating the percentage of each ink to be used to produce the color, white is denoted by (0,0,0). When the white of the printer 714 is darker than the white of proofer 712, transformer 734 typically produces a proofer CMY white value greater than (0,0,0). This typically produces undesired effects such as the existence of screen dots in the analog output of the proofer 712 where none exist in the analog output of the printer 714.

The above undesired effects can be eliminated by editing table 736, via editor 738, to put a (0,0,0) proofer CMY value for a (0,0,0) printer CMY value. However, it will be appreciated that this produces an incorrect colorimetric (XYZ) value for the white produced by proofer 712.

The output of optional editor 738, an edited table 736, or, in the absence of editor 738, a non-edited table 736, is input to a non-linear interpolator 740 for non-linearly interpolating table 736 thereby to produce transformation table 742 which is denser than transformation table 736. The operation of interpolator 740 is described in more detail hereinbelow with reference to FIG. 11.

Transformation table 742 is an N-dimensional CMY-CMY lookup table which is then stored in color converter 744. For any printer CMY value not found in table 736, a linear interpolation is performed on table 742 in order to produce the output proofer CMY value. It will be appreciated that the linearly interpolated value produced from table 742 is generally more accurate than the linearly interpolated value produced from table 736 since table 742 is denser than table 736.

It will be appreciated that, alternatively, color converter 744 can perform a non-linear interpolation from table 736. The present invention does not illustrate this alternative since cost and speed considerations using current computer technology indicate that the above method is presently more desirable.

Transformation table 742 can be used, as is, or it can be made more accurate as follows:

1) Color transformation apparatus 724 utilizes transformation table 742 on the CMY data listed in table 732 to print analog representation 716 whose colorimetric values are subsequently measured.

2) A new conversion table is produced which is then concatenated to conversion table 732 to produce a new version of conversion table 732.

Figure 11:
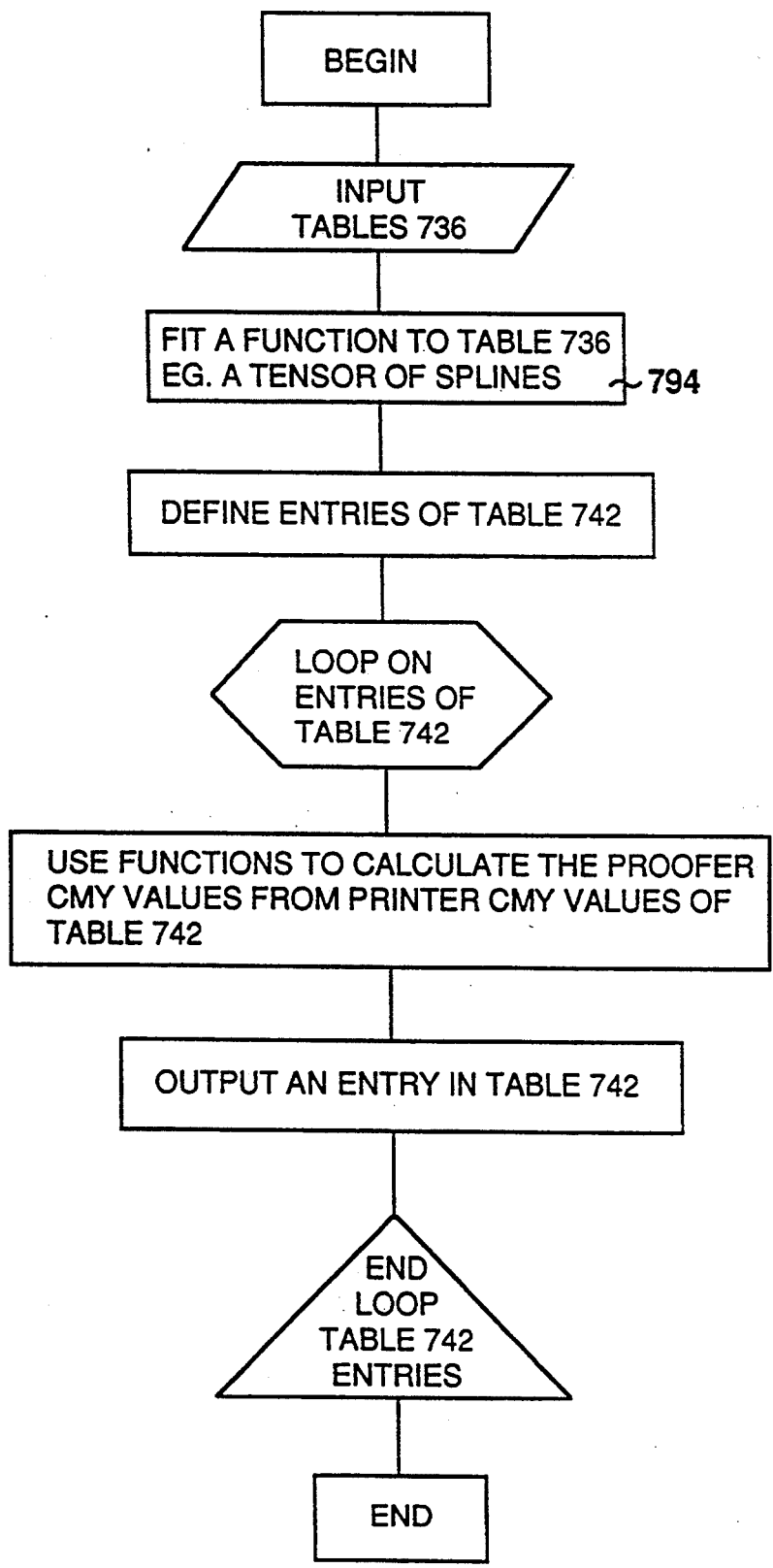
FIG. 11 is a flow chart illustration of an interpolation technique useful in the embodiment of FIG. 9.

3) The method of FIGS. 9–11 is repeated, using the new version of conversion table 732. Steps 1–3 can be repeated any number of times to produce an accurate transformation table 742.

Reference is now made to FIG. 10 which details, in flow chart format, the operation of printer-to-proofer transformer 734.

For each entry in the printer conversion table 730, the operation involves searching the proofer conversion table 732 for entries whose XYZ value is near, by some definition, to the printer XYZ value. The results are stored in a table of close values. This is shown in steps 750–764 of FIG. 10.

Specifically, step 754 requires the initialization of the table of close values. This may take the form of defining a closeness threshold less than which indicates closeness, or it may take the form of a maximum number of close values allowed.

In the second case, as the proofer table 732 is searched, the closest values found, and their distances, are stored. If a closer one is found, the furthest of the stored values is released and the closer one kept. Thus, in step 754, the distances for the initial close values are set to high numbers.

In step 758, the distance between the printer XYZ value and the present proofer XYZ value is calculated, typically as the Euclidean distance. Other suitable distance measures can alternatively be used.

Typically, combinations of the close proofer values found in step 762 are then utilized for the next set of calculations. Combinations must minimally be of one more than the dimension size of the input digital representations. Thus, if the digital representations are in CMY, then there will minimally be four proofer values in each combination. The number of elements in the combination can be predetermined by the operator.

The distance between the printer XYZ value and the combination of proofer XYZ values is calculated as a combination of two elements. The first is the sum of the distances between the individual proofer XYZ values and the printer XYZ value.

The second is an "insideness" measure defining whether or not the printer XYZ value falls within the constellation of proofer XYZ values and can be calculated in a number of ways. For example, a set of linear equations can be solved where equations 2-5 below are an exemplary set for use with a combination containing four proofer points:

$$P_x = F_{x1}m_1 + F_{x2}m_2 + F_{x3}m_3 + F_{x4}m_4 \quad (2)$$

$$P_y = F_{y1}m_1 + F_{y2}m_2 + F_{y3}m_3 + F_{y4}m_4 \quad (3)$$

$$P_z = F_{z1}m_1 + F_{z2}m_2 + F_{z3}m_3 + F_{z4}m_4 \quad (4)$$

$$1.0 = m_1 + m_2 + m_3 + m_4 \quad (5)$$

where the $m_i$ are unknown values $P_j$ indicates the printer X, Y or Z values and $F_j$ indicates the proofer X, Y or Z values.

If the printer XYZ value falls inside the proofer XYZ values, indicated by all positive $m_i$, the insideness measure is given a small positive value. Otherwise, the insideness measure is defined as the absolute value of the sum of the negative $m_i$.

The distance between the printer XYZ value and the proof at XYZ values is defined as the combination of the insideness measure and the distance sum, where the combination is typically by multiplication but can be by any other suitable operation.

For all proofer XYZ combinations close to the printer XYZ the steps 772-776 are performed Weights are calculated such that the weighted vector sum of the proofer XYZ combination is the printer XYZ. In other words, the printer XYZ is at the 'center of mass' of the proofer XYZ combination. This is calculated in step 772 and involves the solution of a linear set of equations, such as equations 2-5.

A preliminary proofer CMY value is then calculated in step 774. Specifically, a weighted vector addition of the proofer CMY values of this combination, found in table 732, is performed using the weights calculated in step 772.

In step 776, the preliminary proofer CMY value of step 774 is assigned a weight which is a function of the distance of the combination to the printer XYZ value as calculated in step 768. Typically, the weight assigned is the distance between the combination and the printer XYZ value divided by the sum of these distances over all combinations close to the printer XYZ value.

The output proofer CMY value which produces a generally identical XYZ value as the printer XYZ value is calculated in step 780 as the weighted sum of all the preliminary proofer CMY values where the weights are those assigned in step 776.

It will be appreciated that alternatively, it is possible to select only the closest proofer combination, calculate its CMY value and use that value as the output proofer CMY value.

Table 736 is a lookup table with the printer CMY value vs. the output proofer CMY value calculated in step 780.

Reference is now made to FIG. 11 which details the non-linear interpolation method of interpolator 740.

A non-linear function, such as a tensor of splines, which defines the relationship between printer CMY values and proofer CMY values is fit to optionally edited conversion table 736 in step 794. Tensors of splines are described in detail in chapter 17 of *A Practical Guide to Splines*, by Carl De Boor, Vol. 27 of the Applied Mathematical Sciences series published by Springer Verlag, New York, 1978, which is incorporated herein by reference. A further reference is *An Introduction to Splines for use in Computer Graphics and Geometric Modeling*, by Richard H. Barrels et al., published by Morgan Kaufmann Publishers, Inc., Los Altos, Calif., 1987.

Once the number and placement of printer CMY values in transformation table 742 are defined, typically via the operator and typically on a grid used by color converter 744, the non-linear function is used to calculate the proofer CMY value for each printer CMY value in table 742. In this manner, table 742 is produced.

Object code for implementing the operations of transformer 734 and interpolator 740, shown in the flow charts of FIGS. 10 and 11, are set forth in Appendices F and G, respectively. Exemplary source code indicating how to interface with the object codes of Appendices F and G is set forth in Appendix H along with instructions as to how to use the source code.

Figure 12:
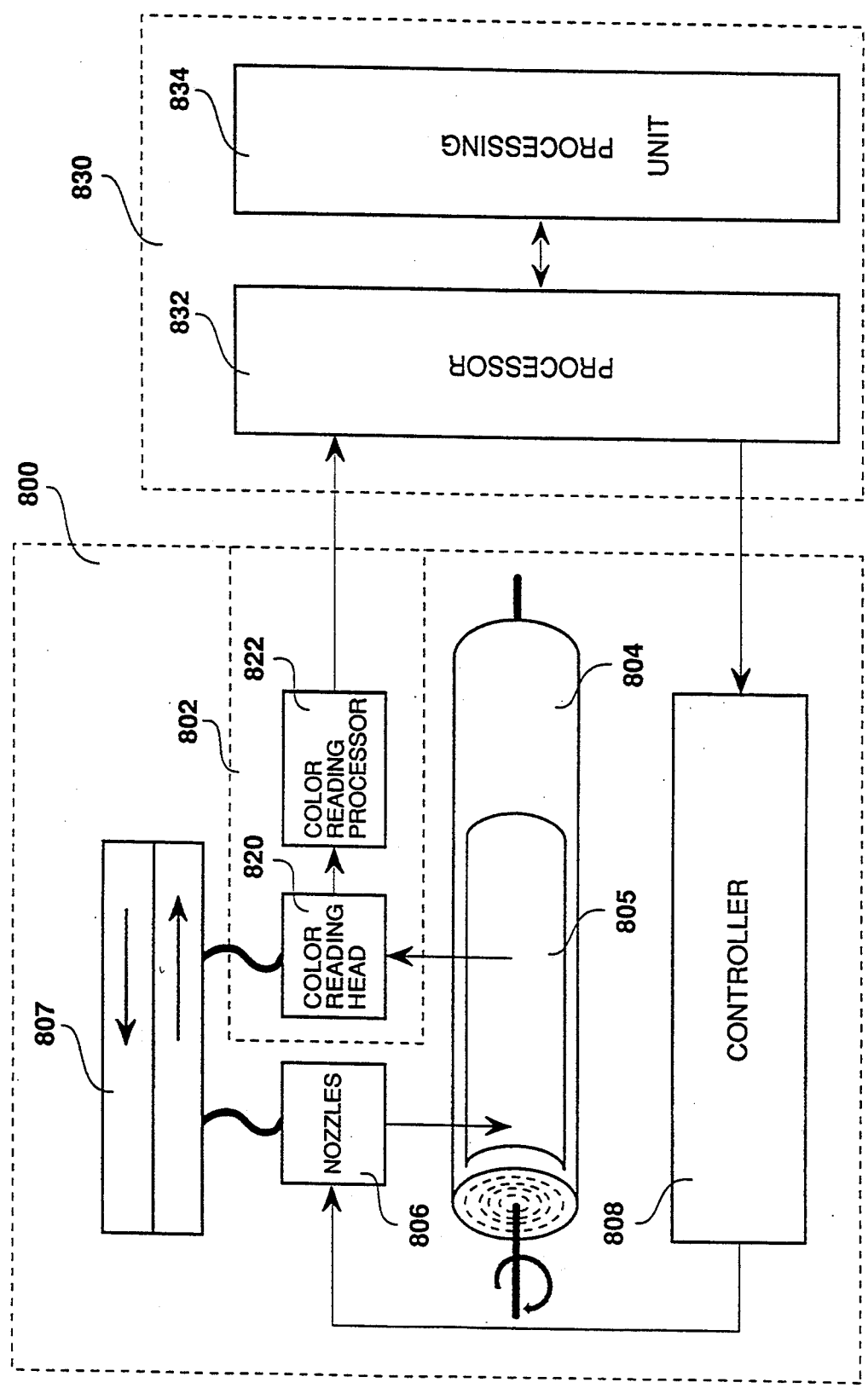
FIG. 12 is a block diagram illustration of a system for reading and writing an image constructed and operative in accordance with the present invention.

Reference is now made to FIG. 12 which illustrates an integrated system for reading and writing an image, suitable for performing the output to output calibration procedures of FIGS. 2A, 2B and 8-11. Thus, the system is capable of producing the conversion tables 736 and-/or 742 of FIG. 9 and LUTs 236, 260 and 262 of FIGS. 2A and 2B.

The system comprises a color proofer 800, for writing an analog representation of an image from a digital representation and a color reading system 802, such as a colorimeter or a spectrophotometer, for creating a digital representation of an image from an analog representation. The color reading system 802 is typically directly connected to the color reproduction system 800. A digital data processor 830 controls the operations of both the color proofer 800 and the color reading system 802.

As is known in the art, color proofer 800 typically comprises a translation system comprising a drum 804 for rotating a substrate 805, such as a piece of paper, upon which will be printed the analog representation of the image, and a translating carriage 807 which moves in one direction as the drum 804 rotates. Onto the translating carriage 807 are attached nozzles 806 for receiving inks in accordance with the digital representation of the image and for affecting the printing of the analog representation of the image onto the substrate 805. A controller 808 simultaneously controls nozzles 806 and the movement of drum 804 and translating carriage 807 in accordance with the digital representation of the image received from data processor 830. Controller 808 also reports information regarding the status of proofer 800 to processor 830.

Any suitable color proofer 800 can be used. An example of which is the Iris color proofer, model 3024, manufactured by Iris Graphics Inc. of Massachusetts, U.S.A..

As is known in the art, color reading system 802 typically comprises a reading head 820, such as a spectrophotometric head, for reading the colors of an analog representation and for producing from them a digital representation of the analog representation and a color reading processor 822 for controlling the operation of the reading head 820 and for receiving its output. Reading head 820 typically comprises a light source and a light detector coupled via an optical system. The elements of the reading head 820 are not shown since they are known in the art. Processor 822 is digitally connected to processor 830 from which it receives instructions and to whom it provides data.

Any suitable color reading system 802 may be used. An example color reading system is the Gretag SPM-700 manufactured by Gretag Ltd. of Regensdorf, Switzerland.

In accordance with the present invention, the reading head 820 is Fixed to the translating carriage 807 of the color proofer 800. This physical connection 803 is noted in FIG. 12 by a curved line. The analog representation to be read is placed on drum 804 and reading is effected during the simultaneous rotation of the drum 804 and translation of carriage 807. Preferably, during the reading operation, nozzle 806 is not activated and thus, no writing is performed.

It will be appreciated that the placement of the reading head 820 onto the translating carriage 807 enables reading and writing to be performed in one machine.

Data processor 830 typically comprises a processor 832 for receiving data from color reading system 802 and for transmitting instructions to controller 808 and a processing unit 834 for controlling processor 832. Processing unit 834 is operative to match the output of a second color reproduction system to the output of color proofer 800 as described hereinabove with reference to FIGS. 2A, 2B and 8-11 and to this end, it controls which operation, the reading or the writing operation, will occur at a given moment.

Processor 832 is typically the processor provided with the color proofer 800, such as the processor provided with the Iris color proofer model 3024 and processing unit 834 is typically a workstation, such as the Whisper workstation manufactured by Scitex Corporation Ltd. of Herzliya, Israel.

The operation of the system of FIG. 12 will now be described with reference to the operations of FIGS. 8-11, it being understood that the system of FIG. 12 is operative also to perform the operations of FIGS. 2A and 2B. Similar reference numerals are used to refer to similar elements:

1) Analog representation 718 from the second color reproduction system (i.e. printer 714) is placed on drum 804 and its color values are read by reading head 820, thereby producing digital representation 722 which is stored in processing unit 834.

2) Analog representation 716 is produced by color proofer 800 using digital representation 710, the representation used to produce analog representation 718.

3) Analog representation 716 remains on drum 804 and its color values are read by reading head 820, thereby producing digital representation 720.

4) Processing unit 834 first produces color conversion tables 730 and 732 from representations 716, 718, 720 and 722 and from them produces the transformation table 742.

Application #3: Duplication of Originals

Figure 3C:
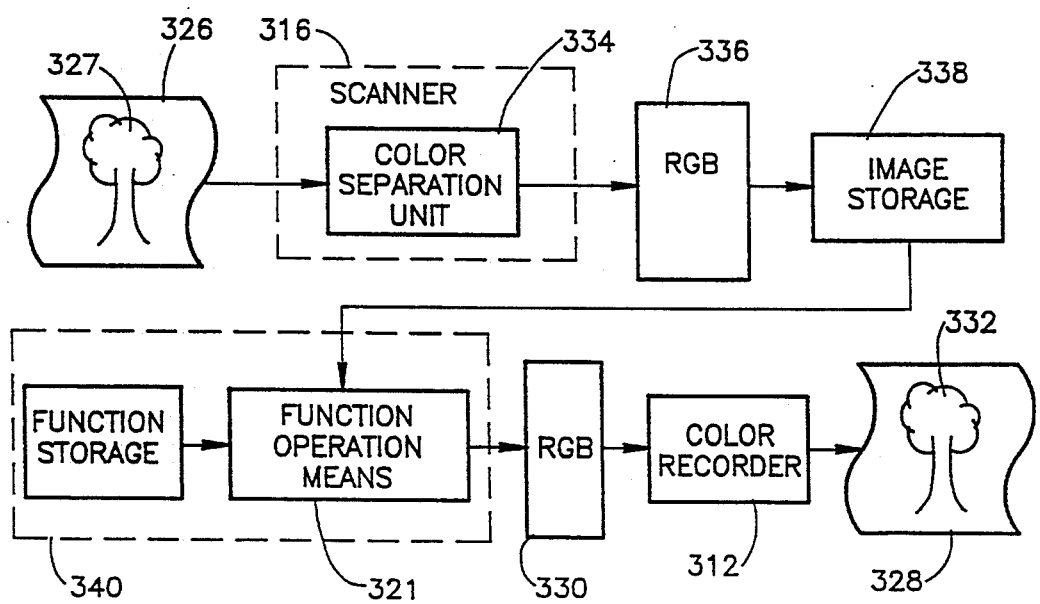
FIGS. 3A, 3B and 3C are schematic illustrations which illustrate respectively a calibration method and two alternative subsequent uses therefor for generating duplications in accordance with a preferred embodiment of the present invention.
Figure 3A:
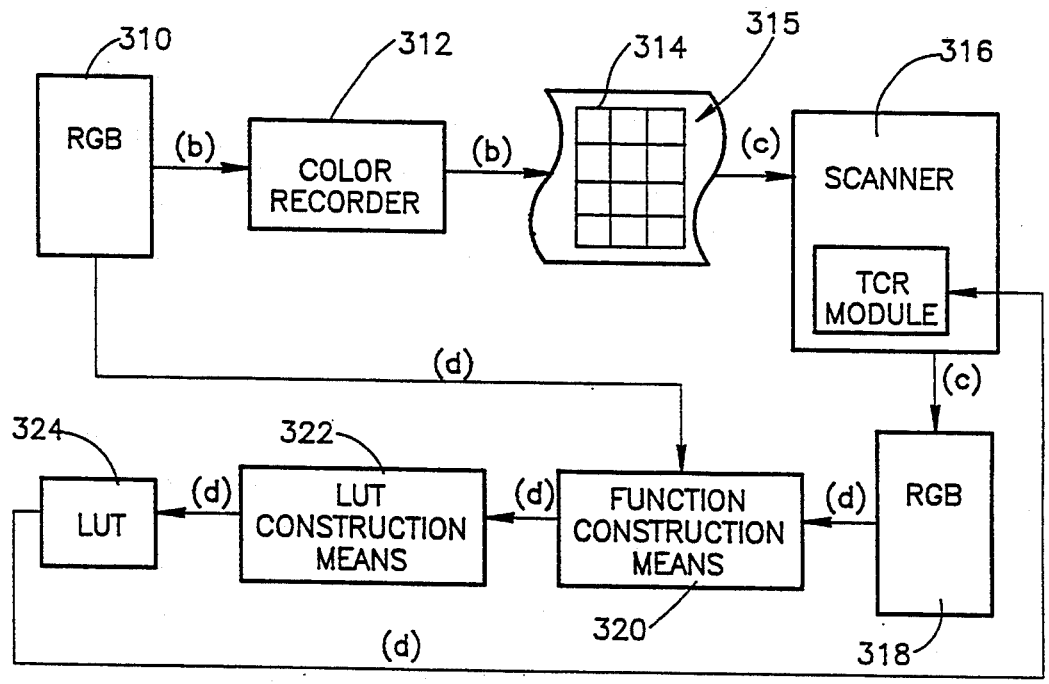
Figure 3B:
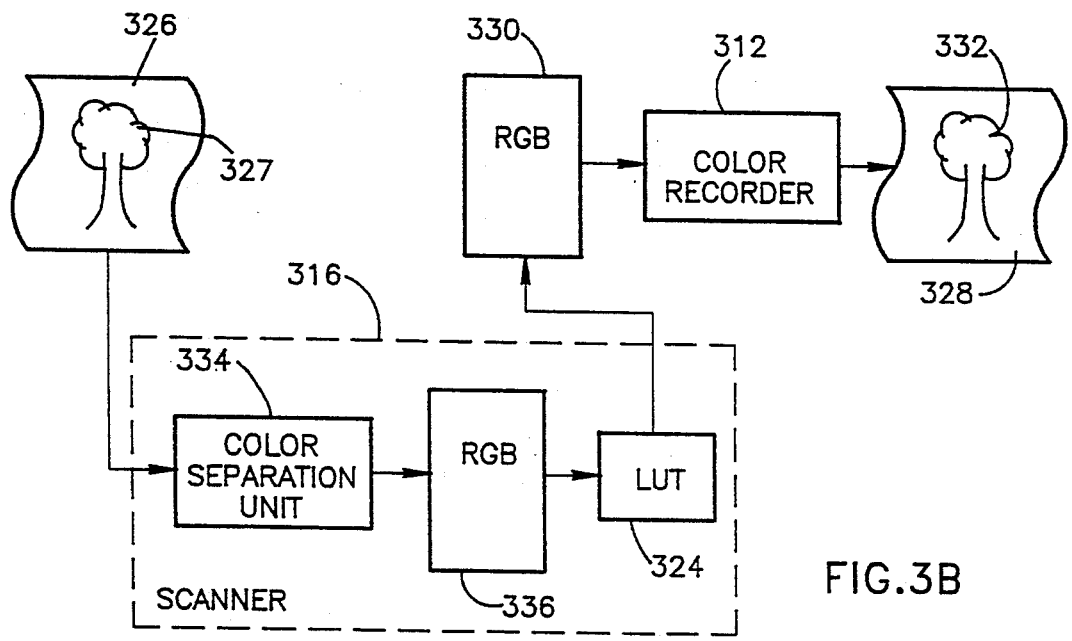

Reference is now made to the schematic illustrations of FIGS. 3A and 3B, which illustrate an embodiment of the invention useful in producing duplications of images existing as hard copies on a particular medium (such as but not limited to a transparency or reflective copy). It is noted that a half-toned printed picture can be duplicated entirely analogously to what will be described herein, except that the picture may be de-screened, using conventional techniques (such as those described in Marquet, M., "Dehalftoning of by negatives optical filtering,", Optics Acta 6, 404–405, 1959; Marquet, M. and J. Tsujiuchi, "Interpretation of Particular Aspects of Dehalftoned Images," Optica Acta 8, 267–277, 1961; and Kermisch, D. and P. G. Roetling, "Fourier Spectra of Halftone Screens", J. Opt. Soc. Amer. 65, 716–723, 1975 the disclosure of which is incorporated herein by reference).

A preferred method for providing for duplication of images represented on a given medium is as follows. Steps (a)–(d) are illustrated in FIG. 3A. Step (e) comprises two alternative methods for duplicating a given image once steps (a)–(d) have been carried out, illustrated in FIGS. 3B and 3C respectively.

a. Provide a first digital representation 310 of a colored image, typically comprising a first plurality of RGBvalues, using the database provision method shown and described hereinabove. Here a "good" database 310 is one which is suitable for sampling the operation of recorder 312 used in conjunction with recording medium 314 and scanner 316, as explained hereinabove in the section on database construction, and is preferably constructed in accordance with the method of FIGS. 7A–7B. Therefore, when using the database provision method of FIG. 7A–7B to construct the database 310, the scanner 316 and the recorder 312 should be used for scanning and recording the initial database.

b. Place a substrate 314 of the desired medium in a color recorder 312 such as a 4cast available from DuPont. According to a preferred embodiment of the present invention, the medium of the substrate 314 is the same as the medium of the original 326 (FIG. 3B) which it is desired to duplicate. Load the color recording apparatus 312 with the digital file 310, thereby to provide an analog representation 315 corresponding to the digital representation 310 of the colored image.

c. Read the analog representation 315 using a color reading device 316 such as an analog ECSS or a DECSS, thereby to obtain a second digital representation 318 of the colored image, preferably comprising a second plurality of RGB values corresponding to the plurality 310 of RGB values.

d. Input digital representations 310 and 318 to function construction means 320, which is operative to construct a function from the plurality of color values 318 to the plurality of color values 310 in accordance with the color calibration function computation procedure described hereinabove. The color calibration function computed by function construction means 320 is received by LUT construction means 322. LUT construction means 322 is operative to construct a LUT 324 relating the RGB values 318 to the RGB values 310 and to store the LUT 324 in the TCR module of the scanner 316. The LUT 324 may now be used as follows:

e. Reference is made to FIG. 3B. Given a substrate 326 (preferably of the same medium as substrate 314) bearing an analog representation of a colored image 327, and when it is sought to duplicate the colored image 327 onto a second substrate 328 (preferably of the same medium as substrate 326), the image 327 is scanned by the scanner 316 whose TCR module contains the LUT 324, thereby to obtain a digital representation 330 of the colored image. The digital representation is then recorded by color recording apparatus 312, thereby to obtain a substantially accurate duplicate 332 of the original colored image 327 on substrate 328.

Alternatively, the colored image 327 may be reproduced as in FIG. 3C. As shown, the image 327 is scanned by the scanner 316 using only the color separation unit 334, thereby to define a digital representation 336, preferably comprising a plurality of RGB values, of image 327. The digital representation 336 is stored in storage means 338. The function constructed by function construction means 320 is stored in any suitable storage 340, such as the memory of a suitable computer, preferably in the form of a LUT. Function operation means 321 then operates the function on digital representation 336 which is read from storage means 338, thereby to provide a modified digital representation 330 of image 327. Digital representation 330 is then recorded by color recording apparatus 312, thereby to obtain a substantialy accurate duplicate 332 of the original colored image 327 on substrate 328.

If desired, certain of the above steps can be peformed manually. Specifically, the RGB color values of the patches 314 may be manually measured with a color separation scanner and then manually input into function construction means 320, as by a keyboard, instead of being scanned.

According to an alternative embodiment, the image 327 on the substrate 326 is scanned itself to provide digital representation 310 (FIG. 3A). This embodiment is particularly useful in certain applications as it employs precisely those colors required for the duplication of the particular image 327.

Application #4: Reconstruction of Input from Output

Reference is now made to FIGS. 4A-4E, which illustrate a further embodiment of the present invention useful in reconstructing a hard copy produced using a given tone and color reproduction system.

FIG. 4A describes a standard reproduction process of an image on a transparency 412 which is printed as a reflective copy 430. If the original transparency 412 is unavailable, it can be reconstructeed using either the processed digital file 424 or the reflective output 430.

FIG. 4B describes an application in which it is desired to create a single image comprising the tree in picture 412 and the sun in picture 414, and to represent it upon a single substrate, thereby to obtain a single representation 432 (such as a reflective copy) of both the sun and the tree. It may be desired to provide transparencies of the representation of the combined image in which the tree resembles the tree in the original picture 412 and the sun resembles the sun in the original picture 414.

Preferably, the medium of the original picture 412 is substantially identical to the medium of the original picture 414.

Figure 4C:
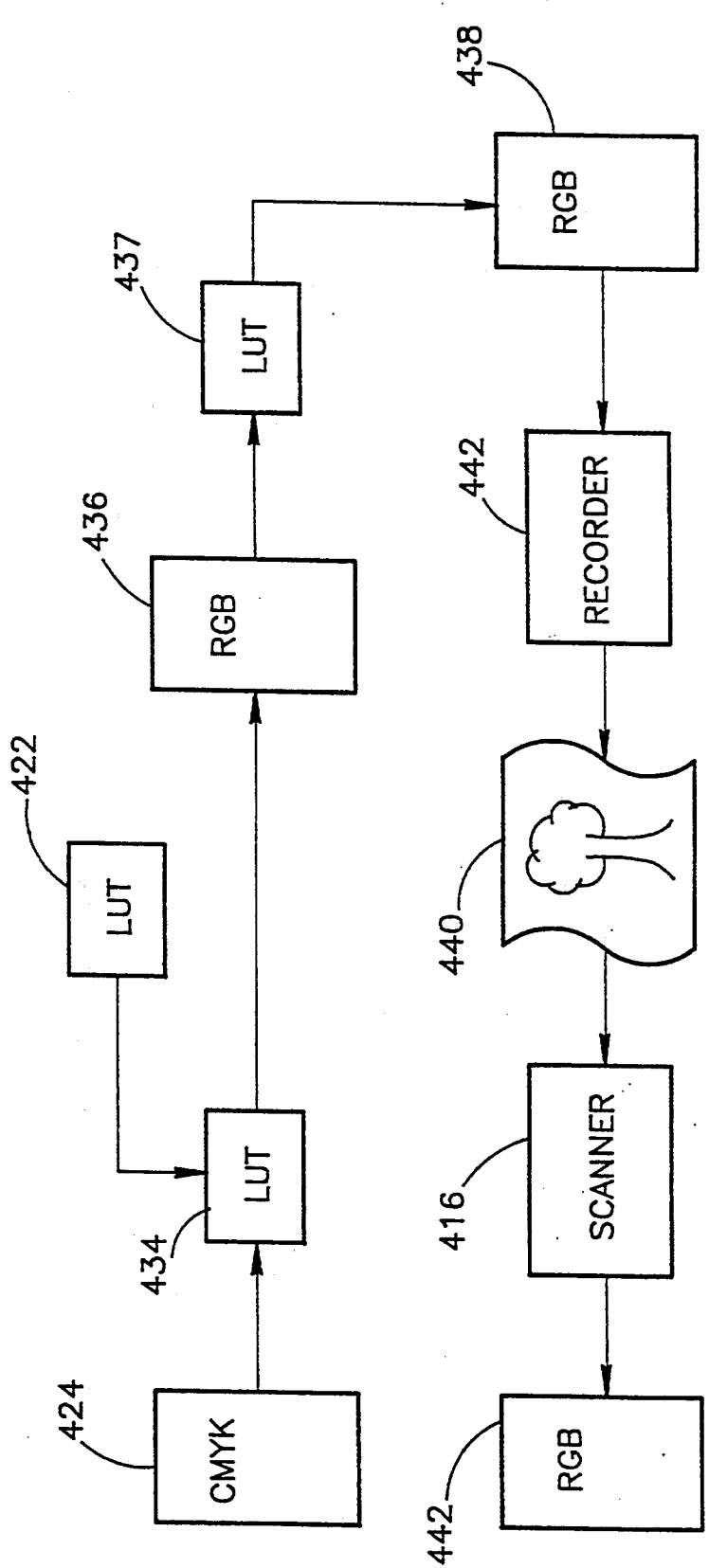

A preferred method of reconstructing the input copy 412 assuming that LUT 422 and digital File 424 are still available is illustrated in FIG. 4C. First, LUT 422 is inverted, using known methods such as those disclosed on page 267 of the above referenced article by Stone et al, thereby to provide an inverted LUT 434. LUT 434 is then operated on digital file 424, thereby to provide a digital file 436, typically comprising a plurality of RGB values, which values are substantially identical to the plurality of RGB values 418 scanned from the input copy 412 (FIG. 4A). The remainder of the procedure consists of constructing a LUT 437 which, when operated on digital file 436, will result in a digital file 438 which when recorded on a substrate 440 (preferably of the same medium as the original 412) by a recorder 442, will result in an analog representation which has the following property: If scanned by scanner 416, analog representation 440 will provide a digital representation 442 substantially identical to digital file 436 (and digital file 418). Preferably, the analog representation also has the property of appearing to the human eye to have substantially the same tone and color as the original 412.

A preferred method of constructing a LUT 437 with at least the former property and typically both properties has been shown and described hereinabove with reference to FIG. 3A, in which the LUT with the desired properties is referenced as LUT 324.

Figure 4D:
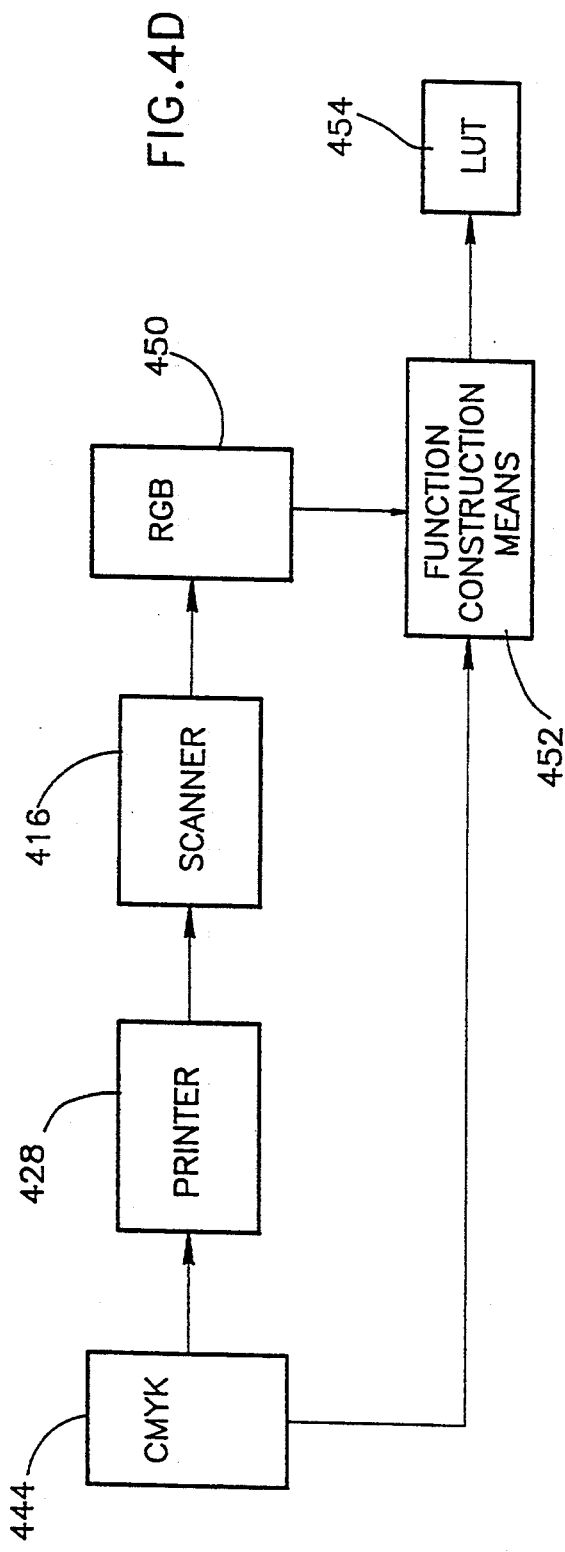
Figure 4E:
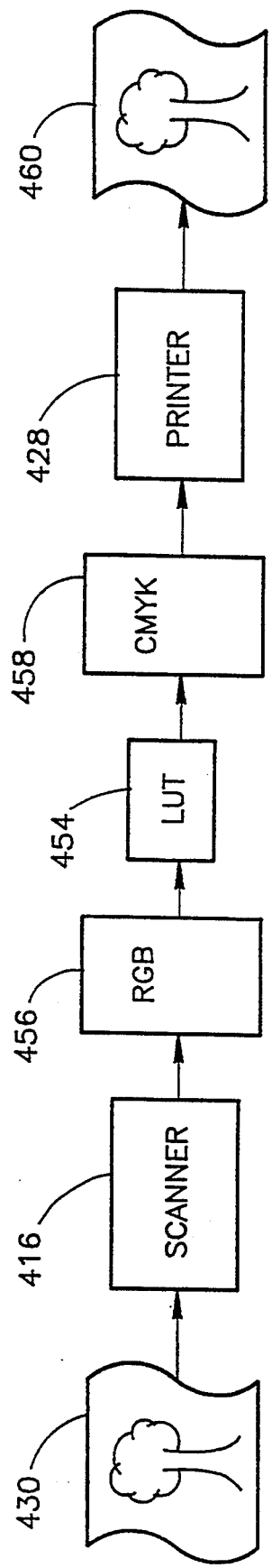

A preferred method of reconstructing the input copy 412 from the output copy 430 when digital file 424 is not available, whereas the printed picture 430 of FIG. 4A is available, is illustrated in FIGS. 4D and 4E. As shown, the method comprises providing a database 444, which is preferably a "good" database for sampling the operation of printer 428 in conjunction with scanner 416 and which typically comprises a plurality of CMYK values. The database 444 is printed (e.g. as a reflective copy) by printer 428 and is subsequently scanned by scanner 416, thereby to provide a digital file 450. Alternatively, digital file 450 may be predetermined and database 444 may be constructed therefrom using the database construction method shown and described hereinabove with reference to FIGS. 7A-7B. Function construction means 452 receives corresponding pluralities of color values 450 and 444 and constructs a color calibration function from RGB values 450 to CMYK values 444 and preferably stores it in the form of a LUT 454, all in accordance with the function construction procedure shown and described hereinabove.

As shown in FIG. 4E, output copy 430 is scanned by scanner 416 and the resulting digital file 456, typically comprising RGB values, is passed through LUT 454, thereby to provide a digital file 458 preferably comprising a plurality of CMYK values. The plurality 458 of CMYK values, when output by printer 428, will result in a hard copy 460 of the original image which is substantially identical to the hard copy 430. The digital file 458 is substantially identical to digital file 424 of FIG. 4A. Therefore, digital file 458 may be employed to restore the original transparency 412 using the procedure of FIG. 4C.

The color recording apparatus 442 may comprise any suitable color recording apparatus, such as the 4cast plotter available from DuPont.

The computations described hereinabove need not be carried out by the scanner but may alternatively be carried out by any suitable computation means, typically a standard computer such as an IBM PC, which may communicate with the remainder of the apparatus using any suitable conventional communication method.

Application #5: Calibration of a first color separation scanner with reference to a second color separation scanner on a special setting The following embodiment of the present invention is useful when it is desired to calibrate a scanner or other color reading device relative to a reference scanner/reading device on a special setting such as but not limited to GCR, UCR, UCA, etc. This embodiment is particularly useful if the operator is relatively unfamiliar with the special setting.

Figure 5A:
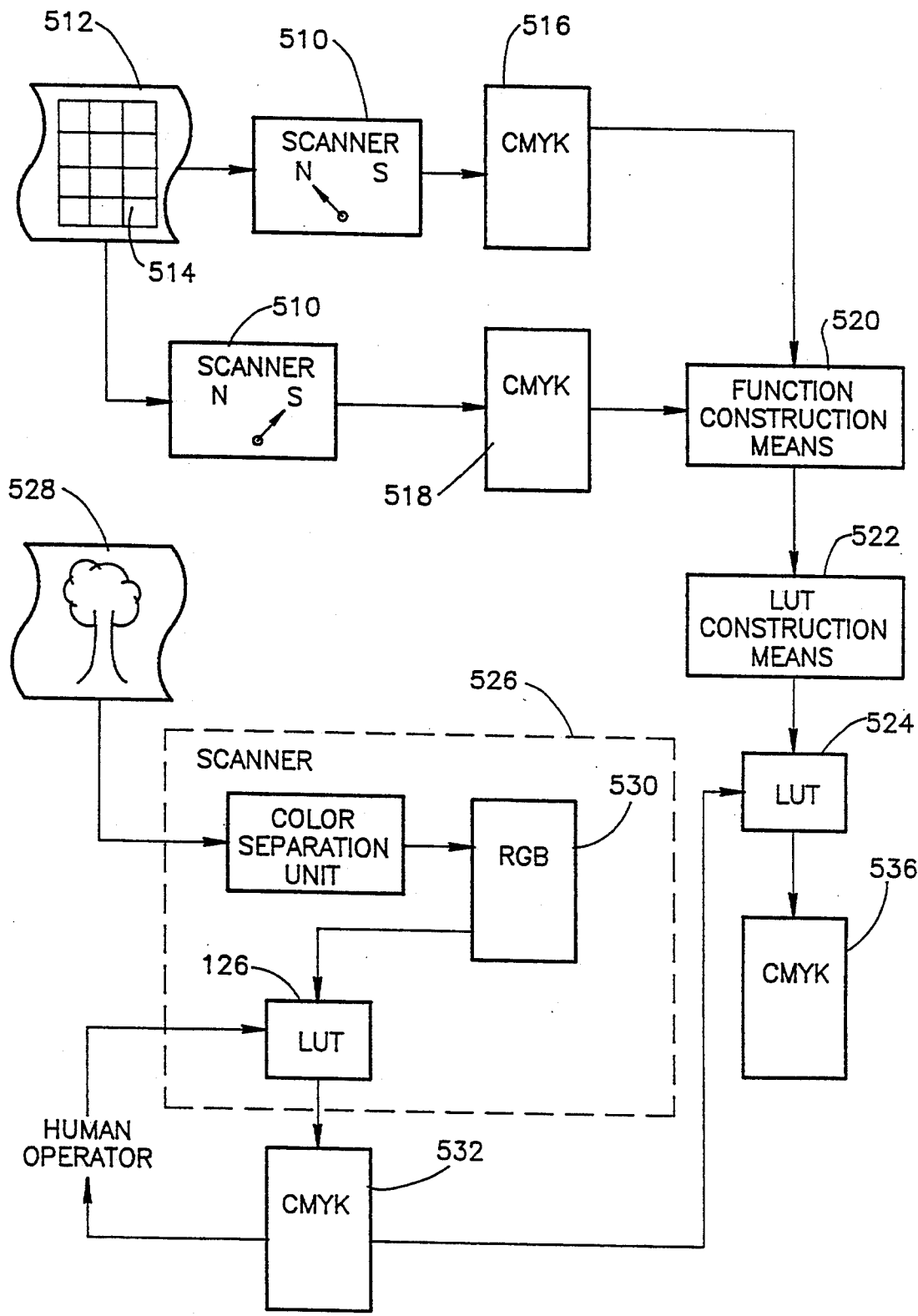
FIGS. 5A and 5B are schematic illustrations of the generation of a calibration transformation or function and its employment in incorporation of a new digital electronic color separation scanner in an existing system for producing UCR, GCR and UCA and any other special setting tone and color reproductions, in accordance with respective alternative embodiments of the present invention.

Reference is now made to FIG. 5A which illustrates an embodiment of the present invention useful in incorporating a new DECSS into an existing TCR system comprising a currently used ECSS (or DECSS) on a special setting.

It is appreciated that, by putting the currently used ECSS onto its special setting, a look up table can be constructed which will allow the new DECSS to emulate the existing TCR system, by using the method of FIGS. 1A and 1B shown and described hereinabove. However, normally, an unmodified implementation of the look up table is undesirable since operators generally Find it difficult to perceive and interpret the special setting CMYK values in the course of subsequent operator controlled tone and color adjustment. Therefore, it is preferable to initially scan the image with a scanner loaded with a "regular" LUT in order to enable the operator to carry out the desired tone and color modifications. Once the modifications have been completed, the modified color values may be converted to the special setting values, thereby to implement the calibration the scanner to be calibrated with reference to the special setting of the reference scanner.

A preferred procedure for calibrating a first color scanner with reference to a second color scanner on a special setting comprises the following steps:

a. The existing scanner 510 is put onto its normal setting N and an analog representation 512 of a colored image comprising a plurality of colored locations 514 is scanned, thereby to obtain a digital representation 516 comprising a plurality of color values, typically CMYK values, corresponding to the plurality of colored locations 514.

The colored image 512 is preferably a "good" database constructed in accordance with the database provision method shown and described hereinabove. Here a "good" database 512 is one whose values are as close as desired to a "target" predetermined plurality of color values. For example, database 512 may comprise a database which is so constructed that it samples the operation of scanner 510 on its special setting in the subrange in which use of a special rather than normal setting makes a substantial difference. Construction of such a database is explained hereinabove in connection with the database construction method of FIGS. 7A–7B.

b. The existing scanner 510 is put onto the desired special setting S and the same colored image is scanned, thereby to obtain a digital representation 518 comprising a plurality of color values, typically CMYK values, corresponding to the plurality of-colored locations 514.

c. Digital representations 516 and 518 are input to function construction means 520, which is operative to construct a function from the plurality of color values 516 to the plurality of color values 518 in accordance with the color calibration function computation procedure shown and described hereinabove. The color calibration function computed by function construction means 520 is received by LUT construction means 522. LUT construction means 522 is operative to construct a LUT 524 relating the CMYK values 518 to the CMYK values 516 and to store the LUT 524 in the TCR module of the scanner 510. Implementations of means for constructing a function and storing it as a LUT "on the fly" are disclosed in Appendices A and B.

d. When it is desired to use the new DECSS 526 to scan an input copy 528, the input 528 is scanned with the scanner 526, thereby to obtain a digital representation 530 of the input 528. The RGB (typically) values of digital representation 530 are typically converted using the standard LUT 126 of FIG. 1A, resulting in a second digital representation 532 of input 528, preferably comprising a plurality of CMYK values which are "standard" in that they are familiar to a human operator accustomed to working on a normal setting and thus easily modifiable by the operator.

e. Desired tone and color manipulations may be carried out by a human operator, typically on LUT 126, resulting in modifications of digital representation 532 in subsequent versions thereof.

f. Once the operator has completed the step of manipulating tone and color, LUT 524 is employed to convert each of the normal setting CMYK values of the digital representation 532 to the corresponding special setting CMYK values, resulting in a final digital representation 536 of the input 528, which is substantially identical to the digital representation of input 528 which would result by scanning input 528 with scanner 510 on its special setting and performing the same operator-input tone and color manipulations.

Figure 5B:
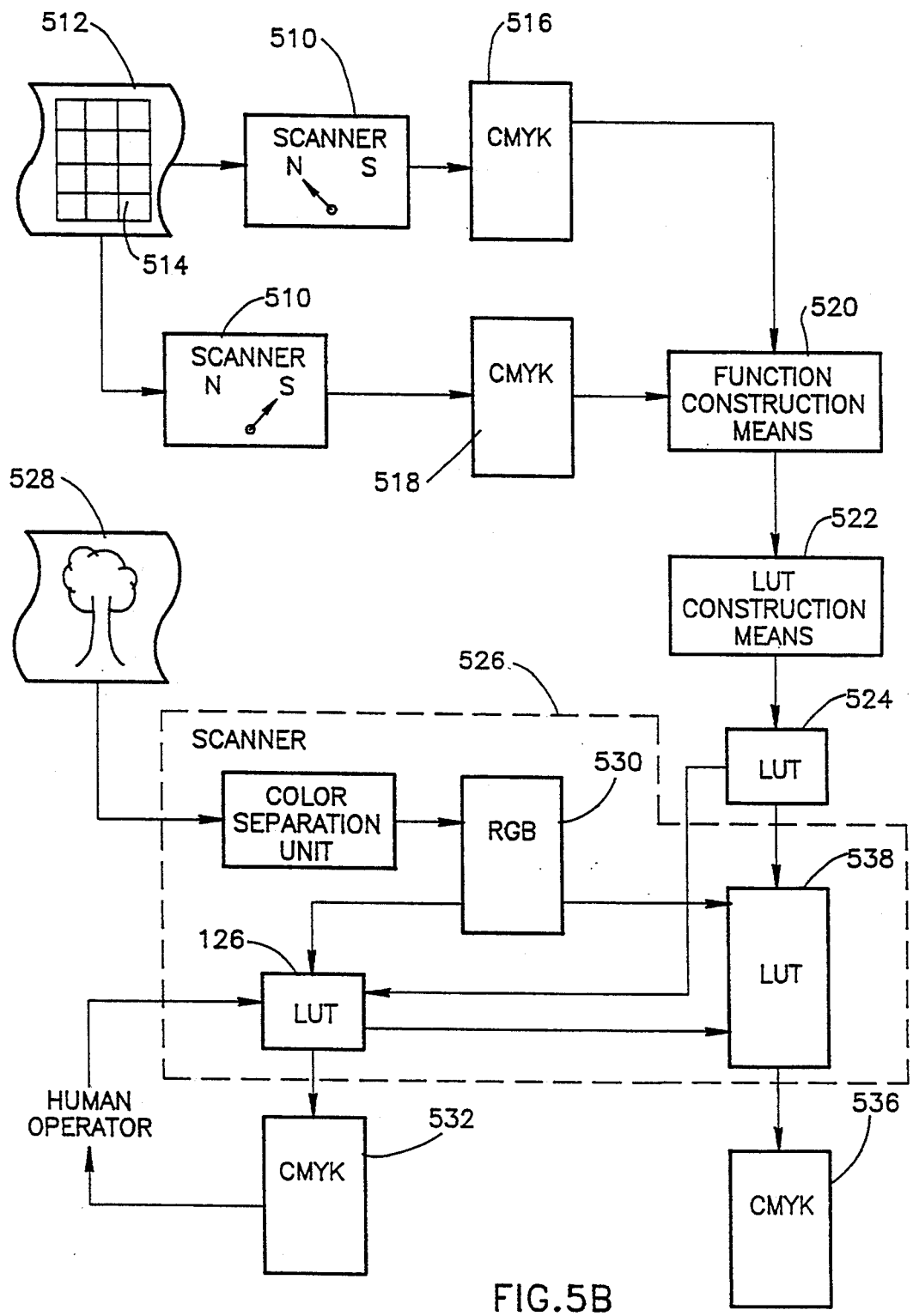

Alternatively, as shown in FIG. 5B, following the execution of tone and color modifications by the operator, the CMYK values of LUT 126 may be converted, thereby to define a converted LUT 538, by using the conversion stored in LUT 524 or by operating the function constructed by function construction means 520 on LUT 126. LUT 538 may be stored in the TCR module of the scanner 526. Digital representation 530 may then be directly converted by LUT 538, preferably on the fly, to provide the final digital representation 536.

It is noted that here as throughout the present specification, the color calibration function whose construction is described hereinabove may be stored in the memory of any suitable commercially available computing means, such as the IBM PC.

Application #6: Calibration of a color monitor display with reference to output apparatus Reference is now made to FIG. 6 which is a schematic illustration of a method for calibration of a CRT with reference to output apparatus. The objective is to provide an analog representation 610, on a CRT display 616, of a colored image, which representation resembles a hard copy representation 612 of the colored image output from a printing device 214. It may be appreciated that the present method and apparatus are generally similar to the method and apparatus of FIG. 2, where a printing device 216 (rather than a CRT) is calibrated with reference to output apparatus 214. Identical reference numerals are employed to reference identical elements in FIGS. 2 and 6 to facilitate understanding of the similarity. The distinguishing elements of the method and apparatus of FIG. 6 will now be discussed.

Figure 6:
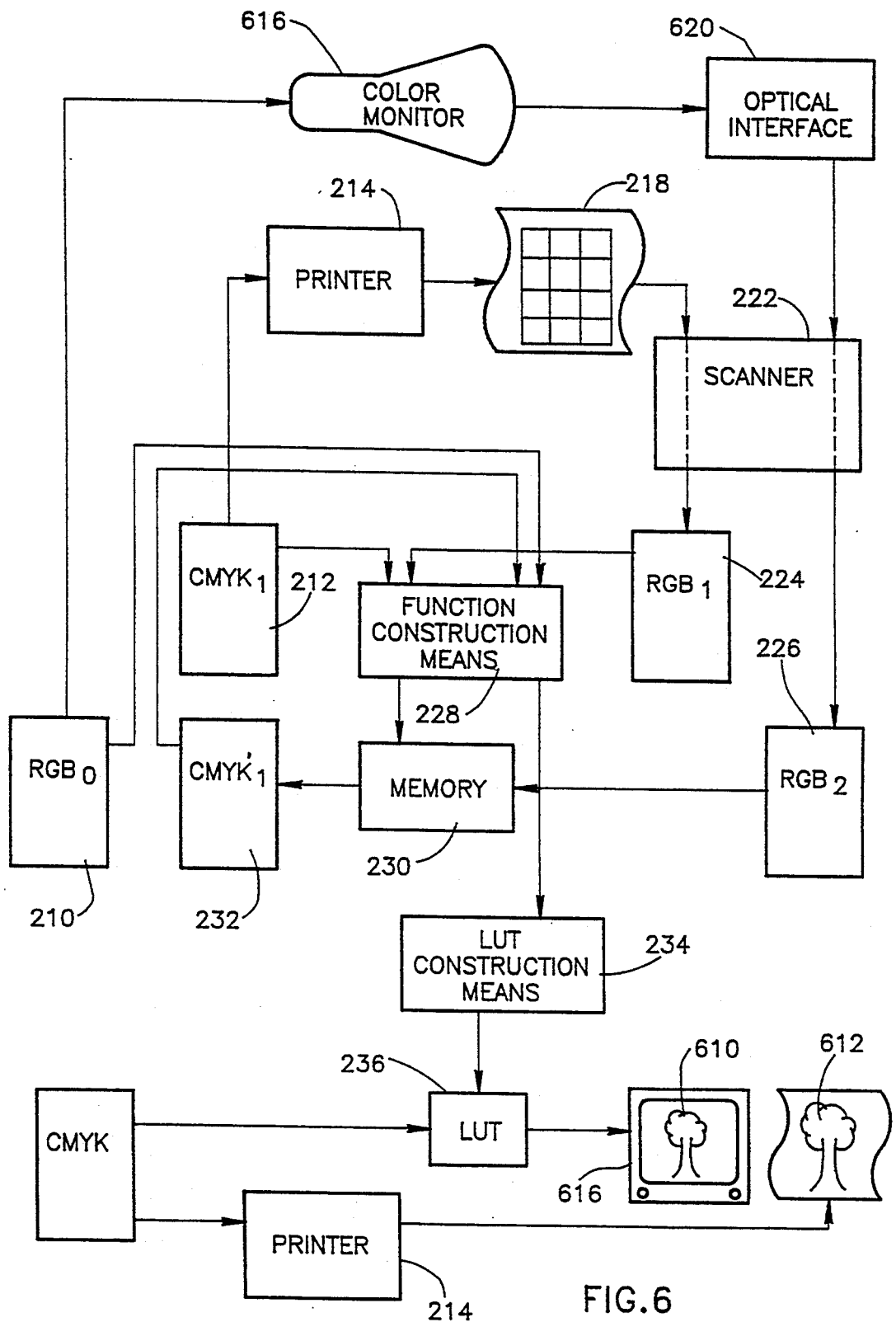
FIG. 6 is a schematic illustration of a method for calibration of a color monitor display with reference to output apparatus in accordance with a further preferred embodiment of the present invention.

As shown in FIG. 6, an optical interface 620 is required to enable scanner 222 to receive input from CRT 616. The particular interface required varies according to the scanner 222. For example, the Scitex Smart Scanner may be optically coupled to the screen of the monitor 616 by mechanically disconnecting and removing the color separation head of the scanner from the interior of the scanner while maintaining the electrical wiring connections and placing the head in front of the monitor. Also, the RGB values 210 are preferably displayed one after the other on the CRT screen 616 and are received one at a time by the scanner 222. Synchronization of the scanner with the monitor is required. This procedure is provided on the Smar Scanner available from Scitex.

As in Application #2, it may be desirable to convert pluralities of RGB values 224 and 226 to XYZ values or values from any other suitable coordinate system, using conventional apparatus and techniques, such as those described in P. G. Engeldrum, "Almost Color Mixture Functions", Journal of Imaging Technology, 14(4), August 1988, and in references 2 and 5-7 cited therein. The disclosures of this article and of all references cited therein are incorporated herein by reference. Also, it is appreciated that any suitable color reading device may replace the scanner 222.

If desired, RGB values 226 may be read in CMC form by optical interface 620. The filter arrangement of the normally used color separation head of the Smart Scanner may be replaced by a CMC filter arrangement which emulates the human eye. CMC filter arrangements and methods for constructing them are described in the above referenced article entitled "Almost color mixture functions" as well as in references 2, 5 and 6 thereof. Preferably, the illumination of analog representations 610 and 612 should be such that their respective white areas will be of substantially the same brightness.

Application 7: Calibration of an Input Device to an Image Processing Device

Image creation and processing systems may be used to merge or combine more than one color image into a single color image and/or to modify input color images. For example, it may be desired to create a color image comprising a first portion obtained by photographic techniques and subsequently read into the image processing system, preferably using conventional scanning techniques, and a second portion generated by the graphic software of the image processing system. Alternatively or in addition, it may be desired to use the graphic software of the image processing system to modify a digital representation of a photographic image or of any other color image generated externally of the image processing system.

Unfortunately, the coordinates used to define internally generated images, denoted here as creation system coordinates, are typically different than those used to define externally generated images, denoted here as scanner coordinates. For example, a RGB color value (0,0,10) in scanner coordinates might result in a first input color blue while producing an output of a second color blue in creation system coordinates. However, when combining internally and externally generated images, or when modifying an externally generated image within the graphic software, it is desired to match the two coordinate systems such that the RGB color value (0,0,10) represents the same color for the scanner input and the image processing unit.

A preferred method and apparatus for achieving one or both of the above objectives is shown and described herein. The apparatus and method shown and described herein have the particular advantage of automatically and generally without resorting to human judgement providing an output from the image processing system which generally resembles the input thereto, apart from the modifications or merge operations performed on the input by the image processing system. In this context, two analog representations resemble one another if a color reading device reading both representations will output substantially the same digital representation for both analog representations.

Figure 13:
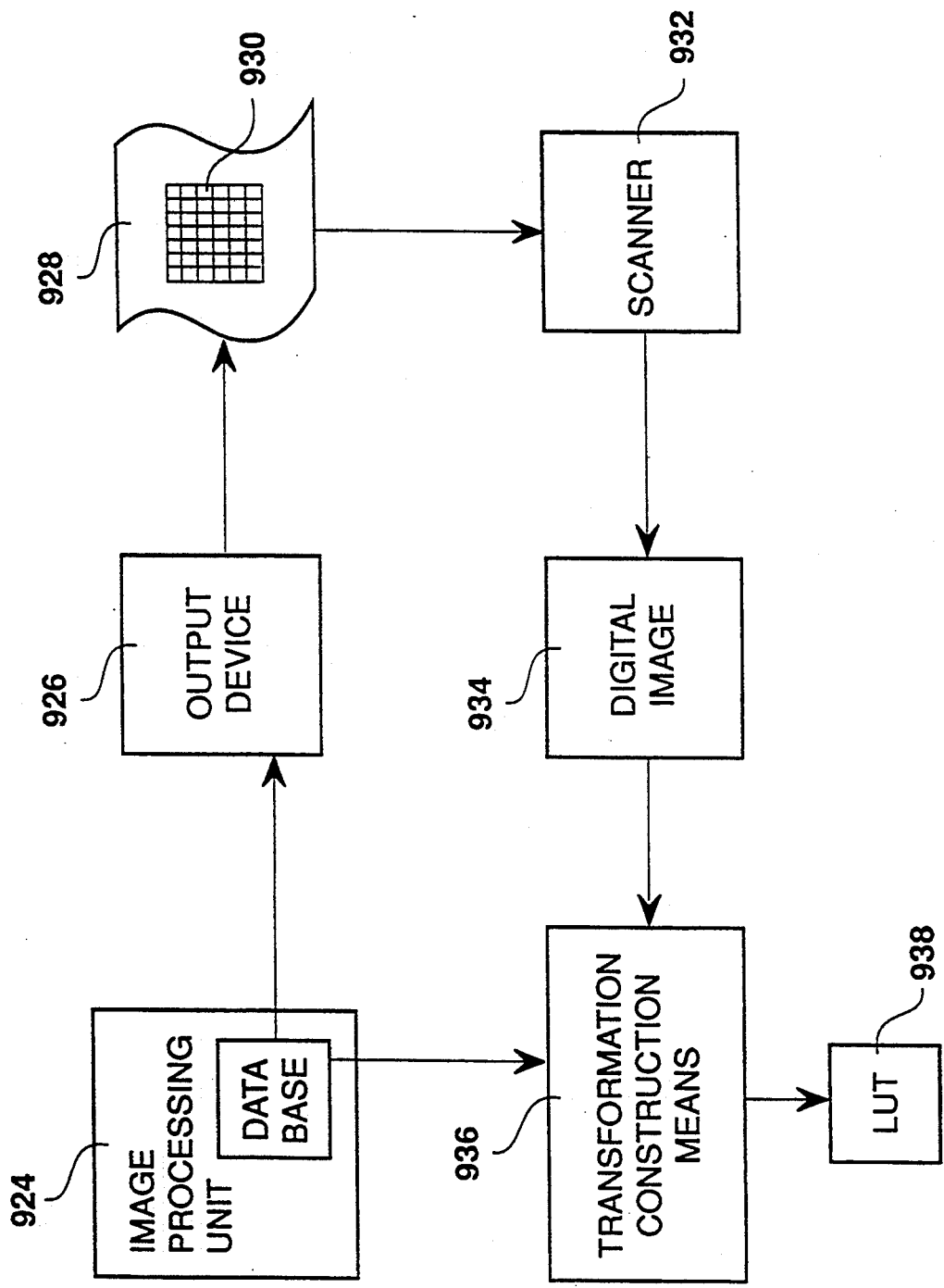
FIG. 13 is a general block diagram illustrating apparatus for calibrating a scanner to an image processing unit to a scanner, the apparatus being constructed and operative in accordance with an alternative embodiment of the present invention.

Reference is now made to FIG. 13 which illustrates calibration of an image processing system comprising a color reading device 932, such as a scanner, means for modifying a digital representation of a color image, such as graphic software 954 (FIG. 14), and a color output device 926, such as a plotter or other color output apparatus. The calibration enables an image read by the scanner 932 to be processed and to be subsequently output by the plotter 926, substantially without causing distortion of the representation of the color image input to the scanner 932, except for the intentional modifications performed thereupon by the image processing system.

As seen in FIG. 13, a digital database 922 is input to, generated in, read from an analog image, or otherwise made available to an image processing unit 924. The digital database 922 generally comprises a plurality of digital color values, defined in the color coordinate system of image processing unit 924.

Figure 14:
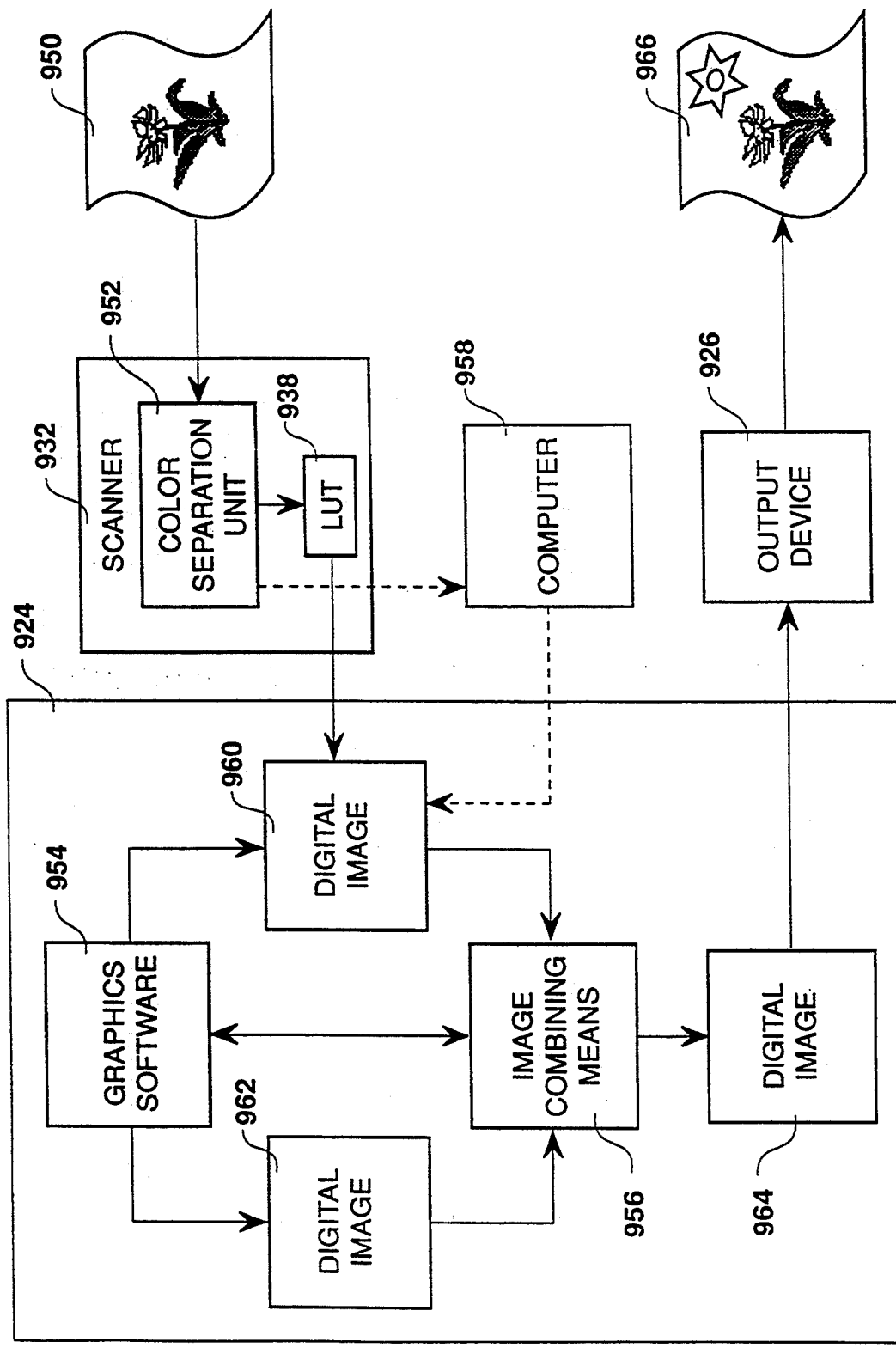
FIG. 14 is a general block diagram illustrating use of the apparatus of FIG. 13.

The database 922 typically comprises a digital file which may be generated by any suitable means, such as via graphic software, or alternatively may be input into the image processing system by any suitable communication method, such as via magnetic tape. Database 922 is output by color output apparatus 926, such as a 4cast plotter, commercially available from DuPont, on any suitable substrate 928, such as a transparency, thereby to provide an analog representation 930 corresponding to the digital representation 922 of the database. Preferably the substrate 928 should be of the same medium as the substrate which it is desired to use to bear the analog images 950 which it is intended to process (FIG. 14). By 'same medium' it is meant the same product. Thus, if it is intended to process using ektachrome substrates produced by Kodak Corporation of the U.S.A., then ektachrome substrates are preferably used for substrate 928.

Analog representation 930 is read by color reading device 932, which may comprise any suitable device such as the Smart Scanner, commercially available from Scitex Corporation, Herzlia, Israel. Scanner 932 produces a digital representation 934 whose color values are defined in the coordinate system of scanner 932.

Digital representation 934 of the database and the original digital representation 922 of the database are both then input into transformation construction apparatus 936. Transformation construction apparatus 936 is operative to construct a transformation from the digital representation 934 the digital representation 922 and to output this transformation in any suitable form. The transformation is, effectively, a transformation from the color coordinate system of the scanner 932 to that of the image processing unit 924 combined with the output device 926.

Preferably, the transformation is output and stored as a LookUp Table (LUT) 938. The LUT 938 may subsequently be loaded onto scanner 932 or onto suitable computing means, such as an IBM PC or a suitable module that may exist in the image processing unit 924, and may then be used as described hereinbelow with reference to FIG. 14.

Transformation construction apparatus 936 is preferably constructed and operative as described hereinabove.

The plurality of digital color values of database 922 typically represents the color space in which the operator of the image processing apparatus works. It typically has a predetermined pattern, typically comprising patches of color, which typically has at least a minimum density of data (digital color values) in every location of interest. The predetermined pattern may, for example, be a generally even distribution throughout generally the entirety of the producible color space. If certain volumes of the color space are more important to the operator, then the operator may define more color patches in that volume to allow a more accurate represenation of the volume.

Specifically, the operator may produce his desired database 922 as follows:

1. An initial database of patches is produced wherein the colors of the patches have a subset of possible three dimensional eight bit digital color values, where a typical subset is defined as the following combinations of Red (R), Green (G) and Blue (B):

$$R = n*50$$
$$G = m*50 \quad (6)$$
$$B = p*50$$

where n, m and p are the entirety of integer values between 0 and 5, inclusive. This produces 216 patches.

2. The initial database is output to a substrate such as film, by the output device 926, thereby producing an analog output.

3. The operator visually selects on the analog output those patches of the initial database that are included in the color space volume that he wishes to be more accurately represented in his desired database 922 and indicates his selections to image processing unit 924. For example, one selected patch might be the patch that was created by:

$$R=50, G=100, B=150.$$

4. For each selected patch, a plurality of patches are created which are close to it in color. For example, eight more colors might be created which are in the color volume around the selected example color by taking the entirety of combinations of:

$$R = n*25 + 50$$
$$G = m*25 + 100 \quad (7)$$
$$B = p*25 + 150$$

where n, m and p are either 1 or −1.

An alternative method for constructing a database with a desired distribution is as described hereinabove with respect to FIGS. 7A and 7B.

Use of the calibrated apparatus of FIG. 13 will now be described, with reference to FIG. 14. There is shown an analog representation 950 of a color image which it is desired to process, using the image processing system of FIG. 13 which comprises graphic software 954 or any other suitable means for producing or modifying representations of color images, including combining or merging means 956 for combining more than one representation of color images into a single representation of a single, combined color image, as well as the scanner 932 and the output device 926.

As shown, the analog representation 950 is read by a color reading device 932, such as a Smart Scanner, commercially available from Scitex Corporation, which is substantially identical to scanner 932 of FIG. 1B, and which is loaded with LUT 938 of FIG. 13. Alternatively, the color reading device 932 may not be loaded with LUT 938 nor with any representation of the transformation constructed by transformation construction means 936 of FIG. 13. Instead, the output of color separation unit 952 of the scanner 932, normally in the form of RGB separations or quasi log of RGB separations of the scanner, may be input into transformation operation means 958. Transformation operation means 958 may comprise any suitable computer, such as an IBM PC or a module of the image processing system 924, and is operative to transform the input thereto in accordance with LUT 938 constructed by transformation computation means 936 of FIG. 13.

The transformed output of scanner 932, typically comprising a digital file 960 in the color coordinate system of the image processing system 924, is input to image processing system 924, typically comprising graphic software 954 and/or merging means 956. The digital file 960 may be modified by graphic software 954 and/or it may be merged with another digital image 962 by merging means 956. The merged image may, if desired, be modified by graphics software 954. The final modified and/or merged digital representation 964 is then transformed into an analog image 966, using output device 926 of FIG. 13. The portions of analog image 966 from inital image 950 which did not undergo the modification described hereinabove will be substantially identical in appearance to the initial image 950.

Any suitable method may be employed for merging at least a portion of the digital file 960 with at least a portion of digital image 962. Apparatus and methods for merging color images are described and claimed in Applicant's Israel Application No. 93493, the disclosure of which is incorporated herein by reference.

It will be appreciated by persons skilled in the art that the present invention is not limited to what has been particularly shown and described hereinabove. Rather, the scope of the present invention is defined only by the claims that follow:

We claim:

1. A technique for calibrating a color processing device comprising the steps of:

comparing a first digital representation of a colored image with a second digital representation thereof, said first digital representation defining a plurality of first non-scalar color values, said second digital representation defining a plurality of second non-scalar color values corresponding to the plurality of said first non-scalar color values, thereby to provide a transformation pairing each individual one of said first non-scalar color values with a value relatively close to the corresponding one of said second non-scalar color values;

employing at least the transformation to control operation of said color processing device to be calibrated, whereby the color processing device is calibrated generally without reference to human aesthetic judgement, and wherein said first digital representation is characterized in that processing said first digital representation of said colored image with the color processing device provides a second representation of said colored image which defines a provided plurality of color values, each individual one of said provided plurality of color values being substantially equal to a corresponding one of a predetermined plurality of color values falling within a range of said color processing device.

2. A technique according to claim 1, said technique being algorithmic.

3. A technique according to claim 1, and technique being non-interactive.

4. A technique according to claim 1 and wherein said first and second digital representations are not provided by a colorimeter.

5. A technique according to claim 1 and wherein said first and second digital representations are not in an XYZ coordinate system.

6. A technique according to claim 1 and wherein said first and second digital representations are read by color reading apparatus whose colorimetric response differs from the colorimetric response of the human eye.

7. A technique according to claim 1 and wherein said first and second digital representations are read by color reading apparatus whose colorimetric response is not mathematically transformable to any colorimetric response similar to the colorimetric response of the human eye.

8. A technique according to claim 1 and wherein at least some of said non-scalar color values comprise a black component.

9. A technique according to claim 1 and wherein said plurality of first non-scalar color values comprises a plurality of 3-dimensional color values.

10. A technique according to claim 1 and wherein said plurality of second non-scalar color values comprises a plurality of 3-dimensional color values.

11. A technique according to claim 1 and wherein said color processing device comprises a color reading device.

12. A technique according to claim 1 and wherein said color processing device comprises a printing device.

13. A technique according to claim 1 and also comprising, prior to said step of comparing, the step of automatically scanning an analog representation of said colored image, thereby to provide at least one of said first and second digital representations.

14. A technique according to claim 1 and also comprising the step of using said calibrated device to create upon a second substrate a duplication of an analog representation of a colored image upon a first substrate.

15. A technique according to claim 1 and wherein said color processing device to be calibrated comprises a color monitor display.

16. A technique for calibrating a color processing device comprising the steps of:

comparing a first digital representation of a colored image with a second digital representation thereof, said first digital representation defining a plurality of first non-scalar color values, said second digital representation defining a plurality of second non-scalar color values corresponding to the plurality of said first non-scalar color values, thereby to provide a transformation pairing each individual one of said first non-scalar color values with a value relatively close to the corresponding one of said second non-scalar color values;

employing at least the transformation to control operation of said color processing device to be calibrated; and using said calibrated device to create an input copy of a colored image which, when processed by said calibrated device, will result in a given output copy of said colored image, whereby the color processing device is calibrated generally without reference to human aesthetic judgement.

17. A technique for calibrating a color processing device comprising the steps of:

comparing a first digital representation of a colored image with a second digital representation thereof, said first digital representation defining a plurality of first non-scalar color values, said second digital representation defining a plurality of second non-scalar color values corresponding to the plurality of said first non-scalar color values, thereby to provide a transformation pairing each individual one of said first non-scalar color values with a value relatively close to the corresponding one of said second non-scalar color values;

employing at least the transformation to control operation of said color processing device to be calibrated; and comparing the second digital representation with a third digital representation of the colored image, said third digital representation defining a plurality of third non-scalar color values, thereby to provide a second transformation pairing each individual one of said second non-scalar values with a value relatively close to the correpsonding one of said third non-scalar color values;

wherein said step of employing comprises the step of employing both said transformations to control operation of said color processing device to be calibrated, whereby the color processing device is calibrated generally without reference to human aesthetic judgement, and wherein said color processing device comprises a color reading device.

18. Apparatus for sampling the color processing characteristics of a color processing device, said color processing device being operative to convert a first representation of a colored image to a second representation thereof, said sampling apparatus comprising:

a first representation of a colored image characterized in that processing said first representation of said colored image with the color processing device provides a second representation of said colored image which defines a provided plurality of color values, each individual one of said provided plurality of color values being substantially equal to a corresponding one of a predetermined plurality of color values falling within a range of said color processing device.

19. Apparatus according to claim 18 and wherein said predetermined plurality of color values is characterized in that generally any region of a given size at least partially overlapping the range of the color processing device contains therewithin at least a predetermined number of color values.

20. Apparatus according to claim 18 and wherein said first representation comprises a digital representation.

21. Apparatus according to claim 18 and wherein said first representation comprises an analog representation.

22. Apparatus according to claim 18 and wherein said second representation comprises a digital representation.

23. A method of constructing apparatus for sampling the color processing characteristics of a color processing device, said color processing device being operative to convert a first representation of a colored image to a second representation thereof,
the method comprising the step of repeating at least once the steps of:
providing first and second representations of a colored image, said representations respectively comprising a first multiplicity of first color values and a second multiplicity of second color values corresponding thereto, said first and second representations being characterized in that processing said first representation with said color processing device defines said second representation;
comparing the first representation of the colored image with the second representation thereof, thereby to provide a transformation, characterized in that operating said transformation on each individual one of said second multiplicity of second color values gives a value substantially equal to the corresponding one of said first multiplicity of first color values; and
operating the transformation on said first representation of the colored image, thereby to provide a third representation thereof.

24. A technique according to claim 23 and wherein said transformation is a function defined and continuous over generally the entirety of a range of the color processing device.

25. A method according to claim 23 and wherein said step of repeating at least once comprises step of repeating at least twice the steps of providing, comparing and operating and wherein for each repetition from the second onward, the first representation of the colored image comprises the third representation of the colored image provided in the preceding repetition.

26. A method according to claim 25 wherein said third representation defines a plurality of color values and wherein said step of repeating at least twice comprises the step of repeating the steps of providing, comparing and operating until the plurality of color values defined by the third representation obtained in the last repetition are at a predetermined degree of closeness to a predetermined plurality of color values located within a range of the color processing device.

27. A technique for calibrating a color processing device comprising the steps of:
comparing a first digital representation of a colored image with a second digital representation thereof, said first digital representation defining a plurality of first non-scalar color values, said second digital representation defining a plurality of second non-scalar color values corresponding to the plurality of said first non-scalar color values, thereby to provide a transformation pairing each individual one of said first non-scalar color values with a value relatively close to the corresponding one of said second non-scalar color values; and
employing at least the transformation to control operation of said color processing device to be calibrated,
whereby the color processing device is calibrated generally without reference to human aesthetic judgement and wherein said transformation is a function defined and continuous over generally the entirety of a range of the color processing device.

28. A technique for quality control of a color processing device operative to convert a first representation of a colored image to a second representation thereof, the technique comprising the steps of:
providing apparatus for sampling the color processing characteristics of the color processing device, said sampling apparatus comprising a first representation of a colored image characterized in that processing said first representation of said colored image with the color processing device provides a second representation of said colored image which defines a provided plurality of color values, each individual one of said provided plurality of color values being substantially equal to a corresponding one of a predetermined plurality of color values falling within the range of said color processing device;
causing said sampling apparatus to operate on said color processing device; and
employing the results of the processing step to control operation of the color processing device.

29. A technique for repeatability testing of a color processing device operative to convert a first representation of a colored image to a second representation thereof, the technique comprising the steps of:
providing apparatus for sampling the color processing characteristics of the color processing device, said sampling apparatus comprising a first representation of a colored image characterized in that processing said first representation of said colored image with the color processing device provides a second representation of said colored image which defines a provided plurality of color values, each individual one of said provided plurality of color values being substantially equal to a corresponding one of a predetermined plurality of color values falling within the range of said color processing device;
causing said sampling apparatus to operate on said color processing device;
repeating said step of processing on at least one further occasion; and
comparing the results of at least two repetitions of said processing steps.

30. A method for transforming an element of a domain of a first color printing device to an element of a domain of a second color printing device, the method comprising the steps of:
providing a first transformation from a first digital representation of a colored image to a second digital representation thereof and a second transformation from a third digital representation of a colored image to a fourth digital representation thereof, said second transformation corresponding to said second color printing device, said first transformation corresponding to said first color printing device and said second and fourth digital representations being defined within a single color space; and comparing said first transformation with said second transformation.

31. A method according to claim 30 and also comprising the step of storing the results of said comparing step.

32. A method according to claim 31 wherein the results of said comparing step define a first plurality of matchings between a first plurality of elements of the domain of the second color printing device and a corresponding first plurality of elements of the domain of the first color printing device and wherein said step of storing comprises the step of providing a second plurality of matchings between the domain of the first color printing device and the domain of the second color printing device, said second plurality exceeding said first plurality in number.

33. A method according to claim 32 and wherein said storing step also comprises, prior to said step of providing a second plurality of matchings, the step of modifying at least some of said corresponding first plurality of elements of the domain of the first color printing device.

34. A method according to claim 32 and wherein said step of providing comprises the step of interpolating between individual ones of said first plurality of matchings, thereby to provide individual ones from among said second plurality of matchings.

35. A method according to claim 34 and wherein said step of interpolating comprises the step of carrying out nonlinear interpolation between individual ones of said first plurality of matchings.

36. A method according to claim 35 and wherein said step of carrying out non-linear interpolation comprises the step of fitting a tensor of splines to individual ones of said first plurality of elements of said first domain.

37. A method according to claim 31 and also comprising the step of employing said stored results to control operation of said first color printing device.

38. A method according to claim 31 and including the step of producing a new first transformation using said stored results and repeating said steps of comparing and storing thereby to produce a new transformation between an element of said domain of said first color printing device to an element of said domain of said second color printing device.

39. A method according to claim 38 and wherein said step of employing utilizes a color converter for converting said domain of said first color printing device to said domain of said second color printing device.

40. A method according to claim 30 and wherein said step of comparing comprises the steps of:
searching among the elements of said second digital representation for a plurality of close elements whose values are close to an element of said fourth digital representation;
forming a multiplicity of subsets, each individual one of said subsets containing some of said plurality of close elements;
selecting individual ones from among said multiplicity of subsets;
for each individual selected subset, combining the elements of said first digital representation corresponding to the members of the individual selected subset, thereby to define a combination value for said individual selected subset; and
combining said combination values of each of said individual selected subsets, thereby to provide an element within said first digital representation corresponding to said element within said fourth representation.

41. A method according to claim 40 and wherein said first step of combining comprises the steps of:
assigning a weight to each member of each individual selected subset, said weights being characterized in that, for each individual selected subset, said element of said fourth digital representation is the center of mass of the weighted members of that subset; and
computing a weighted sum of said members of said individual selected subset.

42. A method according to claim 40 and wherein said second step of combining comprises the steps of:
assigning a weight to each individual selected subset, said weights reflecting the arrangement of the members of said individual selected subset relative to said element of said fourth digital representation;
computing a weighted sum of said members of said individual selected subset.

43. A method according to claim 42 and wherein said step of selecting comprises the steps
inspecting the arrangements of the members of said multiplicity of subsets relative to said element of said fourth digital representation; and
selecting individual ones from among said multiplicity of subsets in accordance with the result of said step of inspecting.

44. Apparatus for transforming an element of a domain of a first color printing device to an element of a domain of a second color printing device comprising;
means for providing a first transformation from a first digital representation of a colored image to a second digital representation thereof and a second transformation from a third digital representation of a colored image to a fourth digital representation thereof, said second transformation corresponding to said second color printing device, said first transformation corresponding to said first color printing device and said second and fourth digital representations being defined within a single color space; and
means for comparing said first transformation with said second transformation.

45. Apparatus according to claim 44 and also comprising means for storing the output of said means for comparing.

46. Apparatus according to claim 45 and also comprising means for employing said stored results to control operation of said first color printing device.

47. Apparatus according to claim 46 and wherein said means for employing utilize a color converter for converting said domain of said first color printing device to said domain of said second color printing device.

48. Apparatus according to claim 45 and including means for producing a new first transformation using said stored output and means for repeatedly operating said means for comparing and for storing thereby to produce a new transformation between an element of said domain of said first color printing device to an element of said domain of said second color printing device.

49. Apparatus according to claim 44 wherein the output of for carrying out non-linear interpolation comprise means for fitting a tensor of splines to individual ones of said first plurality of elements of said first domain.

50. Apparatus according to claim 49 and wherein said means for storing also comprise means for modifying at least some of said corresponding first plurality of elements of the domain of the first color printing device operative prior to the operation of said means for providing a second plurality of matchings, 51. Apparatus according to claim 49 and wherein said means for providing comprise means for interpolating between individual ones of said first plurality of matchings, thereby to provide individual ones from among said second plurality of matchings.

52. Apparatus according to claim 51 and wherein said means for interpolating comprise means for carrying out non-linear interpolation between individual ones of said first plurality of matchings.

53. Apparatus according to claim 52 and wherein said means for carrying out non-linear interpolation comprise means for fitting a tensor of splines to individual ones of said first plurality of elements of said first domain.

54. Apparatus according to claim 44 and wherein said means for comparing comprise:
   means for searching among the elements of said second digital representation for a plurality of close elements whose values are close to an element of said fourth digital representation;
   means for forming a multiplicity of subsets, each individual one of said subsets containing some of said plurality of close elements;
   means for selecting individual ones from among said multiplicity of subsets;
   for each individual selected subset, first means for combining the elements of said first digital representation corresponding to the members of the individual selected subset, thereby to define a combination value for said individual selected subset; and
   second means for combining said combination values of each of said individual selected subsets, thereby to provide an element within said first digital representation corresponding to said element within said fourth representation.

55. Apparatus according to claim 54 and wherein said first means for combining comprise;
   means for assigning a weight to each member of each individual selected subset, said weights being characterized in that, for each individual selected subset, said element of said fourth digital representation is the center of mass of the weighted members of that subset; and
   means for computing a weighted sum of said members of said individual selected subset.

56. Apparatus according to claim 54 and wherein said second means for combining comprise;
   means for assigning a weight to each individual selected subset, said weights reflecting the arrangement of the members of said individual selected subset relative to said element of said fourth digital representation; and
   means for computing a weighted sum of said members said individual selected subset.

57. Apparatus according to claim 56 and wherein said means for selecting comprise;
   means for inspecting the arrangements of the members of said multiplicity of subsets relative to said element of said fourth digital representation; and
   means for selecting individual ones from among said multiplicity of subsets in accordance with the result of said step of inspecting.

58. A system for converting between a digital and an analog representation of an image comprising:

a translation system for translating a reading and writing point across a substrate;
a color proofer comprising said writing point for writing, from said digital representation, said analog representation onto said substrate; and
a color reading system comprising said reading point for reading said digital representation from said analog representation.

59. A system according to claim 58 and wherein said translation system comprises a drum for rotating said substrate and a translating carriage for translating along said drum.

60. A system according to claim 58 and also including means for transforming an element of a domain of a first color printing device to an element of a domain of a second color printing device.

61. A system according to claim 60 and wherein said means for transforming comprise;
   means for providing a first transformation from a first digital representation of a colored image to a second digital representation thereof and a second transformation from a third digital representation of a colored image to a fourth digital representation thereof; and
   means for comparing said first transformation with said second transformation;
   said second transformation corresponding to said second color printing device, said first transformation corresponding to said first color printing device and said second and fourth digital representations being defined within a single color space.

62. A method according to claim 61 and wherein said means for comparing comprise:
   means for searching among the elements of said second digital representation for a plurality of close elements whose values are close to an element of said fourth digital representation;
   means for forming a multiplicity of subsets, each individual one of said subsets containing some of said plurality of close elements;
   means for selecting individual ones from among said multiplicity of subsets;
   for each individual selected subset, means for combining the elements of said first digital representation corresponding to the members of the individual selected subset, thereby to define a combination value for said individual selected subset; and
   means for combining said combination values of each of said individual selected subsets, thereby to provide an element within said first digital representation corresponding to said element within said fourth representation.

63. An image processing device having a first color coordinate system comprising:
   means for receiving a digital representation of a color image defined in a second color coordinate system;
   transformation construction means for providing a transformation between said first color coordinate system and said second color coordinate system; and
   means for employing said transformation to transform said digital representation of said color image into a transformed digital representation of said color image in said first color coordinate system, wherein said image processing device is operative to modify said transformed digital representation of said color image.

64. An image processing device according to claim 63 and wherein said digital representation is provided by an input device.

* * * * *